(12) United States Patent
Dunjic et al.

(10) Patent No.: US 11,651,100 B2
(45) Date of Patent: *May 16, 2023

(54) SYSTEM, DEVICE AND METHOD FOR ENFORCING PRIVACY DURING A COMMUNICATION SESSION WITH A VOICE ASSISTANT

(71) Applicant: The Toronto-Dominion Bank, Toronto (CA)

(72) Inventors: Milos Dunjic, Oakville (CA); David Samuel Tax, Toronto (CA); Arthur Carroll Chow, Markham (CA); Peter Glen Nairn, Cobourg (CA); Edward James Hood, Toronto (CA); Martin Albert Lozon, London (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 328 days.

This patent is subject to a terminal disclaimer.

(21) Appl. No.: 16/903,422

(22) Filed: Jun. 17, 2020

(65) Prior Publication Data
US 2020/0311302 A1    Oct. 1, 2020

Related U.S. Application Data

(63) Continuation of application No. 16/003,691, filed on Jun. 8, 2018, now Pat. No. 10,831,923.

(51) Int. Cl.
*H04L 29/06* (2006.01)
*G06F 21/62* (2013.01)
(Continued)

(52) U.S. Cl.
CPC ...... *G06F 21/6245* (2013.01); *G10L 15/1822* (2013.01); *G10L 15/22* (2013.01);
(Continued)

(58) Field of Classification Search
CPC ...... G06F 21/6245; G06F 21/32; G06F 21/62; H04L 63/0861; H04L 63/104;
(Continued)

(56) References Cited

U.S. PATENT DOCUMENTS 6,023,684 A    2/2000   Pearson
6,907,277 B1   6/2005   Shim
(Continued)

FOREIGN PATENT DOCUMENTS

WO   2001043338       6/2001
WO   2015106230 A1    7/2015
WO   2017213938 A1    12/2017

OTHER PUBLICATIONS

Final Rejection; U.S. Appl. No. 16/144,894, filed Sep. 14, 2020.
(Continued)

*Primary Examiner* — Yogesh Paliwal
(74) *Attorney, Agent, or Firm* — Ridout & Maybee LLP

(57) ABSTRACT

A system, device and method for enforcing privacy during a communication session with a voice assistant are disclosed. Periodically during the communication session with the voice assistant, sensor data is acquired. The sensor data is processed to determine a number of persons present in an environment of the voice assistant. The communication of private data by the voice assistant is enabled when one person is in the environment and that person is the authorized user. The communication of private data by the voice assistant is disabled when one person is in the environment and that person is not the authorized user. When more than one person is present in the environment of the voice
(Continued)

assistant, the communication of private data by the voice assistant may be enabled when the environment of the voice assistant is determined to match the one or more predetermined privacy criteria for a multi-person environment.

20 Claims, 10 Drawing Sheets

(51) Int. Cl.
*H04L 65/1083* (2022.01)
*G10L 15/22* (2006.01)
*H04R 1/40* (2006.01)
*H04L 9/40* (2022.01)
*G10L 15/18* (2013.01)

(52) U.S. Cl.
CPC ........ *H04L 63/0861* (2013.01); *H04L 63/104* (2013.01); *H04L 65/1083* (2013.01); *H04R 1/406* (2013.01); *G10L 2015/223* (2013.01)

(58) Field of Classification Search
CPC ................ H04L 65/1083; H04R 1/406; G10L 2015/223; G10L 15/1822; G10L 15/22
See application file for complete search history.

(56) References Cited

U.S. PATENT DOCUMENTS

| | | |
|---|---|---|
| 7,130,388 B1 | 10/2006 | Bell |
| 7,191,233 B2 | 3/2007 | Miller |
| 7,904,067 B1 | 3/2011 | Tiwari |
| 8,213,962 B2 | 7/2012 | Carr |
| 8,233,943 B1 | 7/2012 | Othmer et al. |
| 8,428,621 B2 | 4/2013 | Vorbau |
| 8,527,763 B2 | 9/2013 | Seibert |
| 8,554,849 B2 | 10/2013 | Heikes |
| 8,738,723 B1 | 5/2014 | Faaborg et al. |
| 8,823,507 B1 | 9/2014 | Touloumtzis |
| 8,848,879 B1 | 9/2014 | Coughlan |
| 9,082,271 B2 | 7/2015 | Ramaswamy |
| 9,104,886 B1 | 8/2015 | Dolbakian |
| 9,734,301 B2 | 8/2017 | King |
| 9,798,512 B1 | 10/2017 | Faaborg |
| 9,824,582 B2 | 11/2017 | Lopez-Hinojosa |
| 10,140,845 B1 | 11/2018 | Knas |
| 10,242,673 B2 | 3/2019 | Cambell |
| 11,017,115 B1* | 5/2021 | Young ..................... G10L 25/48 |
| 2001/0056401 A1 | 12/2001 | Tompkins |
| 2004/0183749 A1 | 9/2004 | Vertegaal |
| 2005/0258938 A1 | 11/2005 | Moulson |
| 2008/0039021 A1 | 2/2008 | Fux et al. |
| 2008/0139178 A1 | 6/2008 | Kawasaki |
| 2008/0288382 A1 | 11/2008 | Smith |
| 2010/0202622 A1 | 8/2010 | Hardee |
| 2010/0205667 A1 | 8/2010 | Anderson et al. |
| 2012/0078623 A1 | 3/2012 | Vertegaal et al. |
| 2012/0303388 A1 | 11/2012 | Vishnubhatla et al. |
| 2013/0278492 A1 | 10/2013 | Stolarz et al. |
| 2013/0324081 A1 | 12/2013 | Gargi |
| 2014/0026105 A1 | 1/2014 | Eriksson et al. |
| 2014/0062697 A1 | 3/2014 | Ramaswamy |
| 2014/0146959 A1 | 5/2014 | Spence |
| 2014/0207469 A1 | 7/2014 | Dykstra-Erickson et al. |
| 2014/0279503 A1 | 9/2014 | Bertanzetti |
| 2014/0372126 A1 | 12/2014 | Ady |
| 2015/0088746 A1 | 3/2015 | Hoffman |
| 2015/0163186 A1 | 6/2015 | Tian |
| 2015/0223200 A1 | 8/2015 | Kim et al. |
| 2015/0347075 A1 | 12/2015 | Levesque et al. |
| 2015/0348551 A1* | 12/2015 | Gruber ................ G10L 15/1822 704/235 |
| 2016/0028584 A1 | 1/2016 | Lee et al. |
| 2016/0080537 A1 | 3/2016 | Kim |
| 2016/0148496 A1 | 5/2016 | Meredith et al. |
| 2016/0179455 A1 | 6/2016 | Liu et al. |
| 2016/0210603 A1 | 7/2016 | Murphy |
| 2016/0261532 A1 | 9/2016 | Garbin et al. |
| 2016/0343034 A1 | 11/2016 | Green et al. |
| 2016/0350553 A1 | 12/2016 | Alameh et al. |
| 2016/0359826 A1 | 12/2016 | Clark |
| 2016/0379373 A1 | 12/2016 | Givon et al. |
| 2016/0381205 A1 | 12/2016 | You et al. |
| 2017/0083282 A1* | 3/2017 | Tsunoda ................. G06F 21/84 |
| 2017/0127226 A1 | 5/2017 | Allen |
| 2017/0148307 A1 | 5/2017 | Yeom et al. |
| 2017/0156042 A1 | 6/2017 | Kwan et al. |
| 2017/0193530 A1 | 7/2017 | Newsum et al. |
| 2017/0243223 A1 | 8/2017 | Kolotinsky |
| 2017/0273051 A1 | 9/2017 | Robinson |
| 2017/0316320 A1 | 11/2017 | Jamjoom et al. |
| 2017/0358296 A1 | 12/2017 | Segalis et al. |
| 2018/0077648 A1 | 3/2018 | Nguyen |
| 2018/0114127 A1 | 4/2018 | Cole et al. |
| 2018/0206083 A1 | 7/2018 | Kumar et al. |
| 2018/0260782 A1 | 9/2018 | Bay |
| 2018/0310159 A1 | 10/2018 | Katz et al. |
| 2018/0359207 A1 | 12/2018 | Chatterjee |
| 2019/0012444 A1 | 1/2019 | Lesso et al. |
| 2019/0050195 A1 | 2/2019 | Knox et al. |
| 2019/0124049 A1 | 4/2019 | Bradley |
| 2019/0141031 A1* | 5/2019 | Devdas ................... H04L 63/18 |
| 2019/0165937 A1 | 5/2019 | Funane |
| 2019/0310820 A1 | 10/2019 | Bates |
| 2020/0104095 A1 | 4/2020 | Sarir |
| 2020/0105254 A1 | 4/2020 | Sarir |

OTHER PUBLICATIONS

Huan Feng, Kassem Fawaz, and Kang G. Shin., Continuous authentication for voice assistants, Proceedings of the 23rd Annual International Conference on Mobile Computing and Networking (MobiCom '17), ACM , , p. 343-355; Oct. 16-20, 2017.
Martin Arnold and Hugo Greenhalgh, Banking biometrics: Best of Money: hacking into your account is easier than you think, Financial Times, https://www.ft.com/content/959b64fe-9f66-11e6-891e-abe238dee8e2 Nov. 4, 2016.
Notice of Allowance; U.S. Appl. No. 16/003,691 dated Mar. 23, 2020.
Office Action; U.S. Appl. No. 16/144,868 dated Apr. 22, 2020.
Office Action; U.S. Appl. No. 16/144,894 dated Apr. 28, 2020.
Notice of Allowance; U.S. Appl. No. 17/063,036 dated Jun. 14, 2022.
Office Action; CA Application No. 3018863 dated Jul. 11, 2022.
Office Action; CA application No. 3007707 dated Aug. 19, 2022.
Office Action; U.S. Appl. No. 17/063,036 dated Mar. 31, 2022.
Office Action; CA Application No. 3018853 dated Oct. 25, 2021.
Advisory Action; U.S. Appl. No. 16/144,894 dated Nov. 25, 2020.
Notice of Allowance; U.S. Appl. No. 16/144,752 dated Jul. 15, 2020.
Final Rejection; U.S. Appl. No. 16/144,868 dated Aug. 10, 2020.
Advisory Action; U.S. Appl. No. 16/144,868 dated Oct. 15, 2020.
Notice of Allowance; U.S. Appl. No. 16/144,868 dated Dec. 9, 2020.
Office Action; CA Application No. 3018873 dated Jun. 29, 2021.
Office Action, U.S. Appl. No. 17/189,429, dated Mar. 15, 2023.

* cited by examiner

US 11,651,100 B2

SYSTEM, DEVICE AND METHOD FOR ENFORCING PRIVACY DURING A COMMUNICATION SESSION WITH A VOICE ASSISTANT

RELATED APPLICATION DATA

The present application is a continuation of U.S. patent application Ser. No. 16/003,691, filed Jun. 8, 2018, the content of which is incorporated herein by reference.

TECHNICAL FIELD

The present disclosure relates to private communications, and in particular, to a system, device and method for enforcing privacy during a communication session with a voice assistant.

BACKGROUND

Voice assistants are software applications that use speech recognition to receive, interpret and execute voice commands. Voice assistants may be provided by a mobile wireless communication device such as a smartphone, desktop or laptop computer, smart device (such as a smart speaker) or similar internet-of-things (IoT) device. Because of the varying environments in which voice assistants may be used, the privacy of communications can be a concern. Thus, there is a need for a method of enforcing privacy during a communication session with a voice assistant.

DESCRIPTION OF EXAMPLE EMBODIMENTS

Figure 1A:
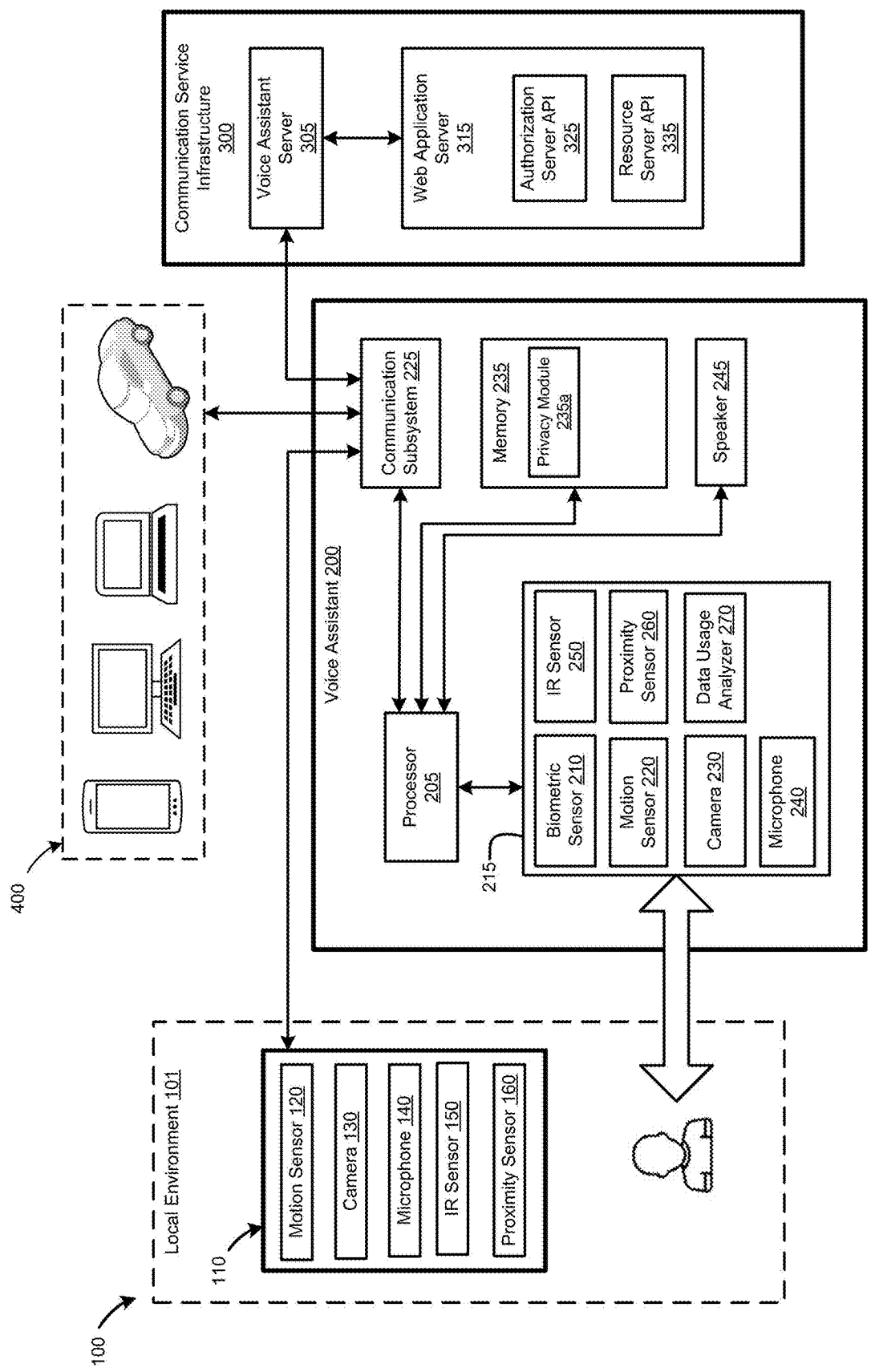
FIGS. 1A, 1B and 1C are schematic diagrams of a communication system in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Lastly, elements referred to in the singular may be plural and vice versa, except where indicated otherwise either explicitly or inherently by context.

In accordance with one embodiment of the present disclosure, there is provided a voice assistant device. The voice assistant device may be a mobile wireless communication device such as a smartphone, desktop or laptop computer, smart device (such as a smart speaker) or a similar IoT device. The voice assistant device comprises a processor, a speaker, a plurality of sensors for sensing an environment of the voice assistant device, and a memory, each of the speaker, the plurality of sensors and the memory being coupled to the processor, wherein the plurality of sensors comprises one or more microphones. A privacy module is stored in the memory, the privacy module comprising executable instructions that, when executed by the processor, cause the voice assistant device to authenticate a user via one or more first criteria in response to a request to initiate a communication session with a voice assistant, and initiate the communication session with the voice assistant in response to a successful authentication of the user. The privacy module also causes the voice assistant device to, periodically during the communication session with the voice assistant, acquire sensor data from one or more sensors of the plurality of sensors, and process the sensor data to determine a number of persons present in an environment of the voice assistant device via one or more second criteria.

When one person is present in the environment of the voice assistant device, the sensor data is processed to identify the one person, and determine whether the one person is the authenticated user based on whether the one person is identified as the authenticated user. When the one person in the environment is determined to be the authenticated user, the communication of private data by the voice assistant is enabled. When the one person in the environment is determined not to be the authenticated user, the communication of private data by the voice assistant is disabled.

When more than one person is present in the environment of the voice assistant device, the sensor data is processed to determine whether the environment of the voice assistant device matches one or more predetermined privacy criteria for a multi-person environment. The one or more predetermined privacy criteria for the multi-person environment may involve assessing whether the multi-person environment is "private". The term "private" in the context of a multi-person environment may be that only authorized persons are present, that unauthorized persons are more than a threshold distance away, or that any persons other than the authorized users are more than a threshold distance away, as described more fully below.

When the environment of the voice assistant device is determined to match the one or more predetermined privacy criteria for a multi-person environment, communication of private data by the voice assistant is enabled. When the environment of the voice assistant device is determined not to match the one or more predetermined privacy criteria for a multi-person environment, communication of private data by the voice assistant is disabled.

In accordance with yet a further embodiment of the present disclosure, there is provided a voice assistant device in which the privacy module comprises executable instructions that, when executed by the processor, cause the voice assistant device to, periodically during a communication session with a voice assistant, acquire sensor data from one or more sensors in the plurality of sensors, and process the sensor data to determine a number of persons present in the environment of the voice assistant device. When one person is present in the environment of the voice assistant device, the sensor data is processed to identify the one person, and determine whether the one person is an authorized user. When the one person in the environment is determined to be an authorized user, communication of private data by the voice assistant is enabled. When the one person in the environment is determined not to be an authorized user, communication of private data by the voice assistant is disabled. When more than one person is present in the environment of the voice assistant device, communication of private data by the voice assistant is disabled.

In accordance with yet a further embodiment of the present disclosure, there is provided a voice assistant device in which the privacy module comprises executable instructions that, when executed by the processor, cause the voice assistant device to authenticate a user via one or more first criteria in response to a request to initiate a communication session with a voice assistant, and initiate the communication session with the voice assistant in response to a successful authentication of the user. The privacy module also causes the voice assistant device to, periodically during the communication session with the voice assistant, acquire sensor data from one or more sensors of the plurality of sensors, send the sensor data to a remote server to process the sensor data, receive privacy enforcement instructions from the remote server in response to processing the sensor data, and apply the privacy enforcement instructions. The application of the privacy enforcement instructions causes the electronic device to enable communication of private data by the voice assistant when one person is present in the environment of the voice assistant device and the one person in the environment has been determined to be the authenticated user, disable communication of private data by the voice assistant when one person is present in the environment of the voice assistant device and the one person in the environment is determined not to be the authenticated user, enable communication of private data by the voice assistant when more than one person is present in the environment of the voice assistant device and the environment of the voice assistant device is determined to match the one or more predetermined privacy criteria for a multi-person environment, and disable communication of private data by the voice assistant when more than one person is present in the environment of the voice assistant device and the environment of the voice assistant device is determined not to match the one or more predetermined privacy criteria for a multi-person environment.

In accordance with yet a further embodiment of the present disclosure, there is provided a voice assistant device in which the privacy module comprises executable instructions that, when executed by the processor, cause the voice assistant device to, periodically during a communication session with the voice assistant: acquire sensor data from one or more sensors of the plurality of sensors, send the sensor data to a remote server to process the sensor data, receive privacy enforcement instructions from the remote server in response to processing the sensor data, and apply the privacy enforcement instructions. The application of the privacy enforcement instructions causes the electronic device to enable communication of private data by the voice assistant when one person is present in the environment of the voice assistant device and the one person in the environment has been determined to be an authorized user, and disable communication of private data by the voice assistant when more than one person is present in the environment of the voice assistant device.

In accordance with yet a further embodiment of the present disclosure, there is provided a voice assistant device in which the privacy module comprises executable instructions that, when executed by the processor, cause the voice assistant device to, periodically during a communication session with the voice assistant to, periodically during a communication session with a voice assistant, acquire sensor data from one or more sensors in the plurality of sensors, process the sensor data to determine whether the environment of the electronic device is private, when the environment of the electronic device is determined to be private, enable communication of private data by the voice assistant, and when the environment of the electronic device is determined to be non-private, disable communication of private data by the voice assistant. In some examples, the privacy module, to disable communication of private data by the voice assistant when the environment of the electronic device is determined to be non-private, is further configured to: generate, via the speaker of the electronic device, an audible notification that the communication session is not private, the notification comprising a voice prompt whether to continue the communication session via a different channel or continue the communication session from a private location; receive, via the one or more microphones, a voice input; parse, via speech recognition, the voice input to extract a command to be performed from a plurality of commands; transfer the communication session to a second electronic device in response to the voice input containing a corresponding command; initiate a call back to a designated telephone number in response to the voice input containing a corresponding command; and temporarily suspend the communication session in response to the voice input containing a corresponding command.

In accordance with yet a further embodiment of the present disclosure, there is provided a server device. The server device comprises a processor and a communication subsystem and a memory each coupled to the processor. A privacy module is stored in the memory. In one embodiment of the server device, the privacy module comprises executable instructions that, when executed by the processor, cause the server device to receive sensor data acquired by one or more sensors of plurality of sensors of an electronic device, and process the sensor data to determine a number of persons present in the environment of the voice assistant device via one or more criteria. The privacy module also causes the voice assistant device to process the sensor data to identify the one person, and determine whether the one person is the authenticated user based on whether the one person is identified as the authenticated user when one person is present in the environment of the voice assistant device. The privacy module also causes the voice assistant device to process the sensor data to determine whether the environment of the voice assistant device matches one or more predetermined privacy criteria for a multi-person environment when more than one person is present in the environment of the voice assistant device. The privacy module also causes the voice assistant device to generate privacy enforcement instructions in response to processing the sensor data, and send the privacy enforcement instructions to a voice assistant device on which the privacy enforcement instructions are to be applied.

The application of the privacy enforcement instructions by the voice assistant device causes the voice assistant device to enable communication of private data by the voice assistant when one person is present in the environment of the voice assistant device and the one person in the environment has been determined to be the authenticated user, disable communication of private data by the voice assistant when one person is present in the environment of the voice assistant device and the one person in the environment is determined not to be the authenticated user, enable communication of private data by the voice assistant when more than one person is present in the environment of the voice assistant device and the environment of the voice assistant device is determined to match the one or more predetermined privacy criteria for a multi-person environment, and disable communication of private data by the voice assistant when more than one person is present in the environment of the voice assistant device and the environment of the voice assistant device is determined not to match the one or more predetermined privacy criteria for a multi-person environment.

In accordance with yet a further embodiment of the present disclosure, there is provided a server device in which the privacy module comprises executable instructions that, when executed by the processor, cause the server device to: receive sensor data acquired by one or more sensors of plurality of sensors of an electronic device; process the sensor data to determine a number of persons present in the environment of the voice assistant device via one or more criteria; process the sensor data to identify the one person and determine whether the one person is an authorized user when one person is present in the environment of the voice assistant device; generate privacy enforcement instructions in response to processing the sensor data; and send the privacy enforcement instructions to a voice assistant device on which the privacy enforcement instructions are to be applied. The application of the privacy enforcement instructions by the voice assistant device causes the voice assistant device to: enable communication of private data by the voice assistant when one person is present in the environment of the voice assistant device and the one person in the environment has been determined to be an authorized user; and disable communication of private data by the voice assistant when more than one person is present in the environment of the voice assistant device.

In accordance with further embodiments of the present disclosure, there is provided a system comprising a voice assistant device and a server as described herein. The system may also comprise one or more sensors external to the voice assistant device and server and/or a voice assistant device, such as a user's smartphone, having one or more sensors, connected to the voice assistant device and/or server.

In accordance with further embodiments of the present disclosure, there are provided methods of enforcing privacy during a communication session with a voice assistant on an electronic device, the methods being performed by the devices as described above and herein.

In accordance with yet a further embodiment of the present disclosure, there is provided a method of enforcing privacy during a communication session with a voice assistant on an electronic device. The electronic device comprises a processor, a speaker, a plurality of sensors for sensing an environment of the electronic device, and a memory, each of the speaker, the plurality of sensors and the memory being coupled to the processor, wherein the plurality of sensors comprises one or more microphones. The electronic device may be a mobile wireless communication device such as a smartphone, desktop or laptop computer, smart device (such as a smart speaker) or a similar IoT device.

The method comprises authenticating a user via one or more first criteria in response to a request to initiate a communication session with a voice assistant, and initiating the communication session with the voice assistant in response to a successful authentication of the user. The method also comprises, periodically during the communication session with the voice assistant, acquiring sensor data from one or more sensors of the plurality of sensors, and processing the sensor data to determine a number of persons present in an environment of the electronic device via one or more second criteria.

When one person is present in the environment of the electronic device, the sensor data is processed to identify the one person, and determine whether the one person is the authenticated user based on whether the one person is identified as the authenticated user. When the one person in the environment is determined to be the authenticated user, the communication of private data by the voice assistant is enabled. When the one person in the environment is determined not to be the authenticated user, the communication of private data by the voice assistant is disabled.

When more than one person is present in the environment of the electronic device, the sensor data is processed to determine whether the environment of the electronic device matches one or more predetermined privacy criteria for a multi-person environment. When the environment of the electronic device is determined to match the one or more predetermined privacy criteria for a multi-person environment, communication of private data by the voice assistant is enabled. When the environment of the electronic device is determined not to match the one or more predetermined privacy criteria for a multi-person environment, communication of private data by the voice assistant is disabled.

In accordance with yet a further embodiment of the present disclosure, there is provided a method of enforcing privacy during a communication session with a voice assistant on an electronic device. The method comprises, periodically during a communication session with a voice assistant, acquiring sensor data from one or more sensors in the plurality of sensors, and processing the sensor data to determine a number of persons present in the environment of the electronic device.

When one person is present in the environment of the electronic device, the sensor data is processed to identify the one person, and determine whether the one person is an authorized user. When the one person in the environment is determined to be an authorized user, the communication of private data by the voice assistant is enabled. When the one person in the environment is determined not to be an authorized user, the communication of private data by the voice assistant is disabled.

In accordance with yet a further embodiment of the present disclosure, there is provided a method of enforcing privacy during a communication session with a voice assistant on an electronic device. The method comprises: authenticating user via one or more first criteria in response to a request to initiate a communication session with a voice assistant; and initiating the communication session with the voice assistant in response to a successful authentication of the user. The method also comprises, periodically during the communication session with the voice assistant, acquiring sensor data from one or more sensors of the plurality of sensors, sending the sensor data to a remote server to process the sensor data, receiving privacy enforcement instructions from the remote server in response to processing the sensor data, and applying the privacy enforcement instructions. The application of the privacy enforcement instructions by the voice assistant device causes the voice assistant device to: enable communication of private data by the voice assistant when one person is present in the environment of the electronic device and the one person in the environment has been determined to be the authenticated user; disable communication of private data by the voice assistant when one person is present in the environment of the electronic device and the one person in the environment is determined not to be the authenticated user; enable communication of private data by the voice assistant when more than one person is present in the environment of the electronic device and the environment of the electronic device is determined to match the one or more predetermined privacy criteria for a multi-person environment; and disable communication of private data by the voice assistant when more than one person is present in the environment of the electronic device and the environment of the electronic device is determined not to match the one or more predetermined privacy criteria for a multi-person environment.

In accordance with yet a further embodiment of the present disclosure, there is provided a method of enforcing privacy during a communication session with a voice assistant on an electronic device. The method comprises, periodically during the communication session with the voice assistant, acquiring sensor data from one or more sensors of the plurality of sensors, sending the sensor data to a remote server to process the sensor data, receiving privacy enforcement instructions from the remote server in response to processing the sensor data, and applying the privacy enforcement instructions. The application of the privacy enforcement instructions by the voice assistant device causes the voice assistant device to: enable communication of private data by the voice assistant when one person is present in the environment of the electronic device and the one person in the environment has been determined to be an authorized user; and disable communication of private data by the voice assistant when more than one person is present in the environment of the electronic device.

In accordance with yet a further embodiment of the present disclosure, there is provided a method of enforcing privacy during a communication session with a voice assistant on an electronic device. The method comprises: receiving sensor data acquired by one or more sensors of plurality of sensors; processing the sensor data to determine a number of persons present in the environment of the electronic device via one or more criteria; processing the sensor data to identify the one person and determine whether the one person is the authenticated user when one person is present in the environment of the electronic device; processing the sensor data to determine whether the environment of the electronic device matches one or more predetermined privacy criteria for a multi-person environment when more than one person is present in the environment of the electronic device; generating privacy enforcement instructions in response to processing the sensor data; and sending the privacy enforcement instructions to a voice assistant device on which the privacy enforcement instructions are to be applied. The application of the privacy enforcement instructions by the voice assistant device causes the voice assistant device to: enable communication of private data by the voice assistant when one person is present in the environment of the electronic device and the one person in the environment has been determined to be the authenticated user; disable communication of private data by the voice assistant when one person is present in the environment of the electronic device and the one person in the environment is determined not to be the authenticated user; enable communication of private data by the voice assistant when more than one person is present in the environment of the electronic device and the environment of the electronic device is determined to match the one or more predetermined privacy criteria for a multi-person environment; and disable communication of private data by the voice assistant when more than one person is present in the environment of the electronic device and the environment of the electronic device is determined not to match the one or more predetermined privacy criteria for a multi-person environment.

In accordance with yet a further embodiment of the present disclosure, there is provided a method of enforcing privacy during a communication session with a voice assistant on an electronic device. The method comprises: receiving sensor data acquired by one or more sensors of plurality of sensors; processing the sensor data to determine a number of persons present in the environment of the electronic device via one or more criteria; processing the sensor data to identify the one person and determine whether the one person is an authorized user when one person is present in the environment of the electronic device; generating privacy enforcement instructions in response to processing the sensor data; and sending the privacy enforcement instructions to a voice assistant device on which the privacy enforcement instructions are to be applied. The application of the privacy enforcement instructions by the voice assistant device causes the voice assistant device to: enable communication of private data by the voice assistant when one person is present in the environment of the electronic device and the one person in the environment has been determined to be an authorized user; and disable communication of private data by the voice assistant when more than one person is present in the environment of the electronic device.

In accordance with yet a further embodiment of the present disclosure, there is provided an electronic device, comprising: a speaker; a plurality of sensors for sensing an environment of the electronic device, wherein the plurality of sensors comprises one or more microphones; a memory; a processor coupled to the speaker, the plurality of sensors and the memory, wherein the processor is configured to cause the electronic device to: periodically during a communication session with a voice assistant: acquire sensor data from one or more sensors in the plurality of sensors; determine, based on the sensor data, a number of persons present in the environment of the electronic device; determine, based on the sensor data, whether the one person present in the environment is an authorized user in response to a determination that one person is present in the environment; enable communication of private data by the voice assistant in response to a determination that one person is present in the environment of the electronic device and the one person in the environment has been determined to be an authorized user; and disable communication of private data by the voice assistant in response to a determination that more than one person is present in the environment of the electronic device.

In accordance with yet a further embodiment of the present disclosure, there is provided an electronic device, comprising: a speaker; a plurality of sensors for sensing an environment of the electronic device, wherein the plurality of sensors comprises one or more microphones; a communication subsystem; a memory; a processor coupled to the speaker, the plurality of sensors, the communication subsystem and the memory, wherein the processor is configured to cause the electronic device to: periodically during a communication session with a voice assistant: acquire sensor data from one or more sensors of the plurality of sensors; send the sensor data to a remote server to process the sensor data; receive privacy enforcement instructions from the remote server in response to processing the sensor data; and apply the privacy enforcement instructions, wherein application of the privacy enforcement instructions causes the electronic device to: enable communication of private data by the voice assistant in response to a determination that one person is present in the environment of the electronic device and the one person in the environment has been determined to be an authorized user; and disable communication of private data by the voice assistant in response to a determination that more than one person is present in the environment of the electronic device.

In accordance with yet a further embodiment of the present disclosure, there is provided a server, comprising: a communication subsystem; a memory; a processor coupled to the communication subsystem and the memory, wherein the processor is configured to cause the server to: receive sensor data acquired by one or more sensors of a plurality of sensors of an electronic device; determine, based on the sensor data, a number of persons present in the environment of the electronic device; determine, based on the sensor data, whether the one person is an authorized user in response to a determination that one person is present in the environment of the electronic device; generate privacy enforcement instructions in response to processing the sensor data; and send the privacy enforcement instructions to the electronic device on which the privacy enforcement instructions are to be applied, wherein application of the privacy enforcement instructions causes the electronic device to: enable communication of private data by the voice assistant in response to a determination that one person is present in the environment of the electronic device and the one person in the environment has been determined to be an authorized user; and disable communication of private data by the voice assistant device when more than one person is present in the environment In accordance with yet a further embodiment of the present disclosure, there is provide an electronic device, comprising: a speaker; a plurality of sensors for sensing an environment of the electronic device, wherein the plurality of sensors comprises one or more microphones; a memory; a processor coupled to the speaker, the plurality of sensors and the memory, wherein the processor is configured to cause the electronic device to: periodically during a communication session with a voice assistant: acquire sensor data from one or more sensors in the plurality of sensors; determine, based on the sensor data, whether the environment of the electronic device is private; enable communication of private data by the voice assistant in response to a determination that the environment of the electronic device is private; disable communication of private data by the voice assistant in response to a determination that the environment of the electronic device is non-private.

In accordance with yet a further embodiment of the present disclosure, there is provided an electronic device, comprising: a speaker; a plurality of sensors for sensing an environment of the electronic device, wherein the plurality of sensors comprises one or more microphones; a communication subsystem; a memory; a processor coupled to the speaker, the plurality of sensors, the communication subsystem and the memory, wherein the processor is configured to cause the electronic device to: periodically during a communication session with a voice assistant: acquire sensor data from one or more sensors in the plurality of sensors; send the sensor data to a remote server to process the sensor data; receive privacy enforcement instructions from the remote server in response to processing the sensor data; and apply the privacy enforcement instructions, wherein application of the privacy enforcement instructions causes the electronic device to: enable communication of private data by the voice assistant in response to a determination that the environment of the electronic device is private; and disable communication of private data by the voice assistant in response to a determination that the environment of the electronic device is non-private.

In accordance with yet a further embodiment of the present disclosure, there is provided a server, comprising: a communication subsystem; a memory; a processor coupled to the communication subsystem and the memory, wherein the processor is configured to cause the server to: receive sensor data acquired by one or more sensors of plurality of sensors of an electronic device; determine, based on the sensor data, whether the environment of the electronic device is private; generate privacy enforcement instructions based on the determination as to whether the environment of the electronic device is private; and send the privacy enforcement instructions to an electronic device on which the privacy enforcement instructions are to be applied, wherein application of the privacy enforcement instructions causes the electronic device to: enable communication of private data by the voice assistant in response to a determination that the environment of the electronic device is private; disable communication of private data by the voice assistant in response to a determination that the environment of the electronic device is non-private.

In accordance with further embodiments of the present disclosure, there are provided non-transitory machine readable mediums having tangibly stored thereon executable instructions for execution by a processor of an electronic device, such as a such as a smartphone, desktop or laptop computer, smart device (such as a smart speaker) or a similar IoT device. The executable instructions, when executed by the processor, cause the electronic device to perform the methods described above and herein.

Communication System

Reference is first made to FIG. 1A which shows in schematic block diagram form a communication system 100 in accordance with one example embodiment of the present disclosure. The communication system 100 comprises a voice assistant device 200, a plurality of sensors 110 located in a local environment surrounding the voice assistant device 200, one or more other electronic devices 400, and a communication service infrastructure 300. The voice assistant device 200 is an electronic device. The voice assistant device 200 may be a multipurpose communication device or a dedicated device. For example, the voice assistant device 200 may be a mobile wireless communication device such as a smartphone, tablet, desktop or laptop computer, smart device (such as a smart speaker) or a similar IoT device.

The plurality of sensors 110 may comprise a motion sensor 120, a camera 130, a microphone 140, an infrared (IR) sensor 150, and/or a proximity sensor 160. The plurality of sensors 110 are communicatively coupled to the voice assistant device 200 via wireless and/or wired connections. The plurality of sensors 110 sense a coverage area within the environment 101. The plurality of sensors 110 may be spaced around the environment 101. The plurality of sensors 110 may be provided by a number of sensor units, each comprising one or more of a motion sensor 120, camera 130, microphone 140, IR sensor 150 or proximity sensor 160, with the sensor units spaced around the environment to increase the coverage area. The environment 101 may be a room or a number of rooms of a house, hotel, apartment of condo building, an entire house, a hotel, or apartment of condo building, a vehicle, or other comparable location.

The voice assistant device 200 communicates with the electronic devices 400 via a communication network such as the Internet. The communication network enables the electronic devices 400 to exchange data with the voice assistant device 200. The communication network may comprise a plurality of networks of one or more network types coupled via appropriate methods known in the art, comprising a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), also referred to as a wireless wide area network (WWAN) or a cellular network. The WLAN may comprise a wireless network which conforms to IEEE 802.11x standards or other communication protocol.

The voice assistant device 200 is equipped for one or both of wired and wireless communication. The voice assistant device 200 may be equipped for communicating over LAN, WLAN, Bluetooth, WAN, PSTN, PLMN, or any combination thereof. The voice assistant device 200 may communicate securely with other devices and systems using, for example, Transport Layer Security (TLS) or its predecessor Secure Sockets Layer (SSL). TLS and SSL are cryptographic protocols which provide communication security over the Internet. TLS and SSL encrypt network connections above the transport layer using symmetric cryptography for privacy and a keyed message authentication code for message reliability. When users secure communication using TSL or SSL, cryptographic keys for such communication are typically stored in a persistent memory of the voice assistant device 200.

The voice assistant device 200 comprises a controller comprising at least one processor 205 (such as a microprocessor) which controls the overall operation of the voice assistant device 200. The processor 205 is coupled to a plurality of components via a communication bus (not shown) which provides a communication path between the components and the processor 205.

The voice assistant device 200 comprises a number of sensors 215 coupled to the processor 205. The sensors 215 comprise a combination of a biometric sensor 210, a motion sensor 220, a camera 230, a microphone 240, an infrared (IR) sensor 250, a proximity sensor 260, a data usage monitor and analyzer 270, and possibly other sensors such as a satellite receiver for receiving satellite signals from a satellite network, orientation sensor, electronic compass or altimeter.

The processor 205 is further coupled to a memory 235 comprising Random Access Memory (RAM), Read Only Memory (ROM), and persistent (non-volatile) memory such as flash memory, and a communication subsystem 225 for communication with the communication service infrastructure 300. The communication subsystem 225 comprises one or more wireless transceivers for exchanging radio frequency signals with wireless networks of the communication system 100. The communication subsystem 225 may also comprise a wireline transceiver for wireline communications with wired networks.

The communication service infrastructure 300 comprises a voice assistant server 305 and a web application server 315. The web application server 315 provides an authorization server application programming interface (API) 325 and a resource server API 335, among other APIs and functions, the functions of which are described below. The voice assistant server 305 and the web application server 315 may be operator by different entities, introducing an additional security in allowing the voice assistant server 305 to assess data of the web application server 315, particularly private data such as banking information. In other embodiments, the voice assistant server 305 may be a server module of the web application server 315 rather than a distinct server. Each of the web application server 315 and voice assistant server 305 comprise a single computer system that may comprise one or more server modules.

The wireless transceivers may comprise one or a combination of Bluetooth® transceiver or other short-range wireless transceiver, a Wi-Fi or other WLAN transceiver for communicating with a WLAN via a WLAN access point (AP), or a cellular transceivers for communicating with a radio access network (e.g., cellular network). The cellular transceiver may communicate with any one of a plurality of fixed transceiver base stations of the cellular network within its geographic coverage area. The wireless transceivers may comprise a multi-band cellular transceiver that supports multiple radio frequency bands. The other types of short-range wireless communication comprise near field communication (NFC), IEEE 802.15.3a (also referred to as Ultra-Wideband (UWB), Z-Wave, ZigBee, ANT/ANT+ or infrared (e.g., Infrared Data Association (IrDA) communication). The wireless transceivers may comprise a satellite receiver for receiving satellite signals from a satellite network that comprises a plurality of satellites which are part of a global or regional satellite navigation system.

The voice assistant device 200 comprises one or more output devices. The output devices comprise a speaker 245. The output devices may also comprise a display. In some examples, the display may be part of a touchscreen. The touchscreen comprises the display, which may be a color liquid crystal display (LCD), light-emitting diode (LED) display or active-matrix organic light-emitting diode (AMO-LED) display, with a touch-sensitive input surface or overlay connected to an electronic controller. A graphical user interface (GUI) of the voice assistant device 200 may be rendered and displayed on the touchscreen by the processor 205. A user may interact with the GUI using the touchscreen and optionally other input devices (e.g., buttons, dials) to display relevant information, such as banking or other financial information, etc. The GUI may comprise a series of traversable content specific menus.

The voice assistant device 200 may also comprise one or more additional input devices such as buttons, switches, dials, a keyboard or keypad, or navigation tool, depending on the type of voice assistant device 200, one or more auxiliary output devices such as a vibrator or light-emitting diode (LED) notification light, depending on the type of voice assistant device 200, or a data port such as serial data port (e.g., Universal Serial Bus (USB) data port.

Operating system software executed by the processor 205 is stored in the persistent memory of the memory 235 along with number of applications. The applications comprise a voice assistant application. The voice assistant may be a client-side component of a client-server application that communicates with a server-side component of the voice assistant server 305. Alternatively, the voice assistant application may be a client application that interfaces with APIs of the web application server 315 or IoT device manager 350. The voice assistant application comprises a privacy module 235a. Other applications such as mapping, navigation, media player, telephone and messaging applications, etc. may also be stored in the memory. The voice assistant application, when executed by the processor 205, allows the voice assistant device 200 to perform at least some embodiments of the methods described herein. The memory 235 stores a variety of data comprising sensor data acquired by the sensors 215, user data comprising user preferences, settings and possibly biometric data about the user for authentication and/or identification (such as voice data, facial data, iris data, typing cadence data, heat signature data, etc.), a download cache comprising data downloaded via the wireless transceivers, and saved files. System software, software modules, specific device applications, or parts thereof, may be temporarily loaded into RAM. Communication signals received by the voice assistant device 200 may also be stored in RAM. Although specific functions are described for various types of memory, this is merely one example, and a different assignment of functions to types of memory may be used in other embodiments.

The above-described communication system is provided for the purpose of illustration only. The above-described communication system includes one possible communication network configuration of a multitude of possible configurations. Suitable variations of the communication system will be understood to a person of skill in the art and are intended to fall within the scope of the present disclosure. For example, the communication service infrastructure 300 may include additional or different elements in other embodiments. The teachings of the present disclosure are flexible and capable of being operated in various different environments without compromising any major functionality. In some embodiments, the system includes multiple components distributed among a plurality of computing devices. One or more components may be in the form of machine-executable instructions embodied in a machine-readable medium.

Figure 1B:
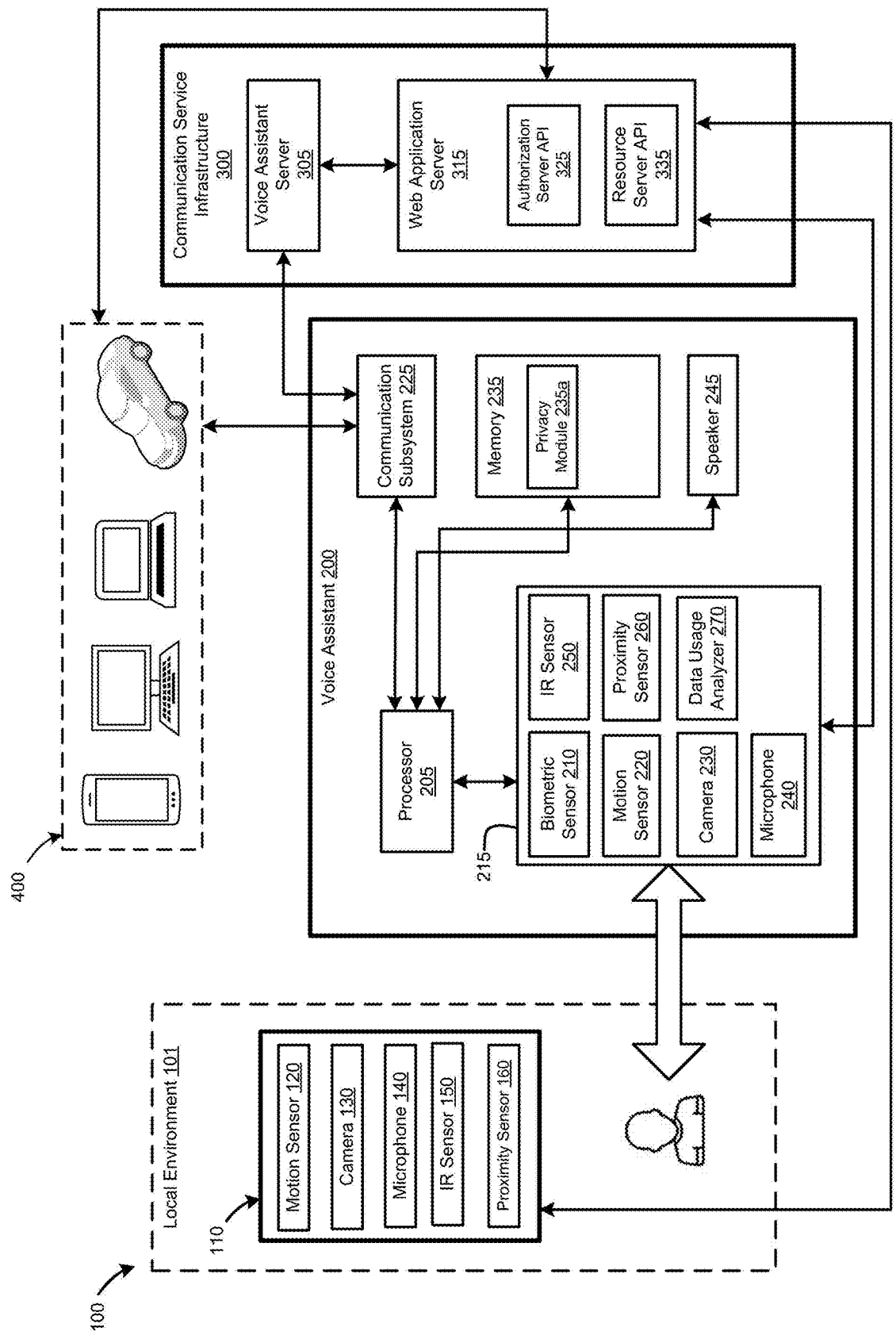
Figure 1C:
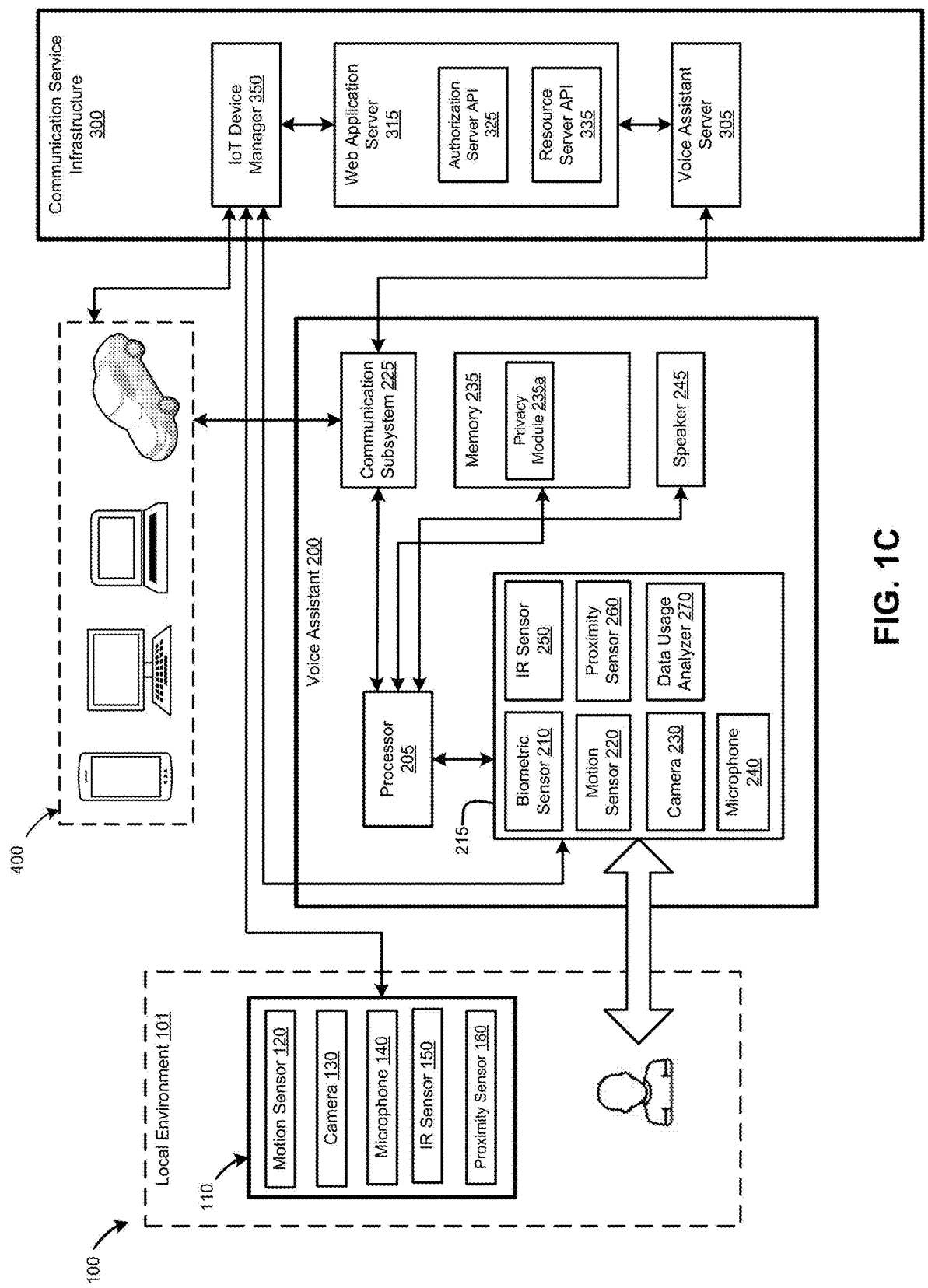

FIGS. 1B and 1C illustrate alternative embodiments of the communication system 100. In FIG. 1A, sensor data from the sensors 110 in the local environment 101 and the sensors 415 of a connected electronic device 400 are received by the voice assistant device 200 for processing, or for forwarding to a remote server, such as the web application server 315, for processing. In FIG. 1B, the sensors 110 in the local environment 101 and the sensors 415 of a connected electronic device 400 communicate directly with the remote server (e.g. web application server 315), for example wirelessly via Wi-Fi, without passing through the voice assistant device 200. Similarly, the sensors 215 of the voice assistant device 200 communicate directly with the remote server, (e.g. web application server 315), for example wirelessly via Wi-Fi, without passing through the voice assistance server 305. However, the voice assistant device 200 still communicates with the voice assistance server 305 for the communications session but the sensor data is provided by a separate data channel between the sensors 110, 215 and 415.

In FIG. 1C, the sensors 110 in the local environment 101, the sensors 215 of the voice assistant device 200 and the sensors 415 of a connected electronic device 400 communicate with an IoT device manager 350 that is part of the communication service infrastructure 300. The IoT device manager 350 is connected to the web application 315, and forwards the acquired sensor data to the web application server 315 for processing. In the embodiment of FIG. 1C, the voice assistant device 200 still communicates with the voice assistance server 305 for the communications session but the sensor data is provided by a separate data channel between the sensors 110, 215 and 415.

Figure 2:
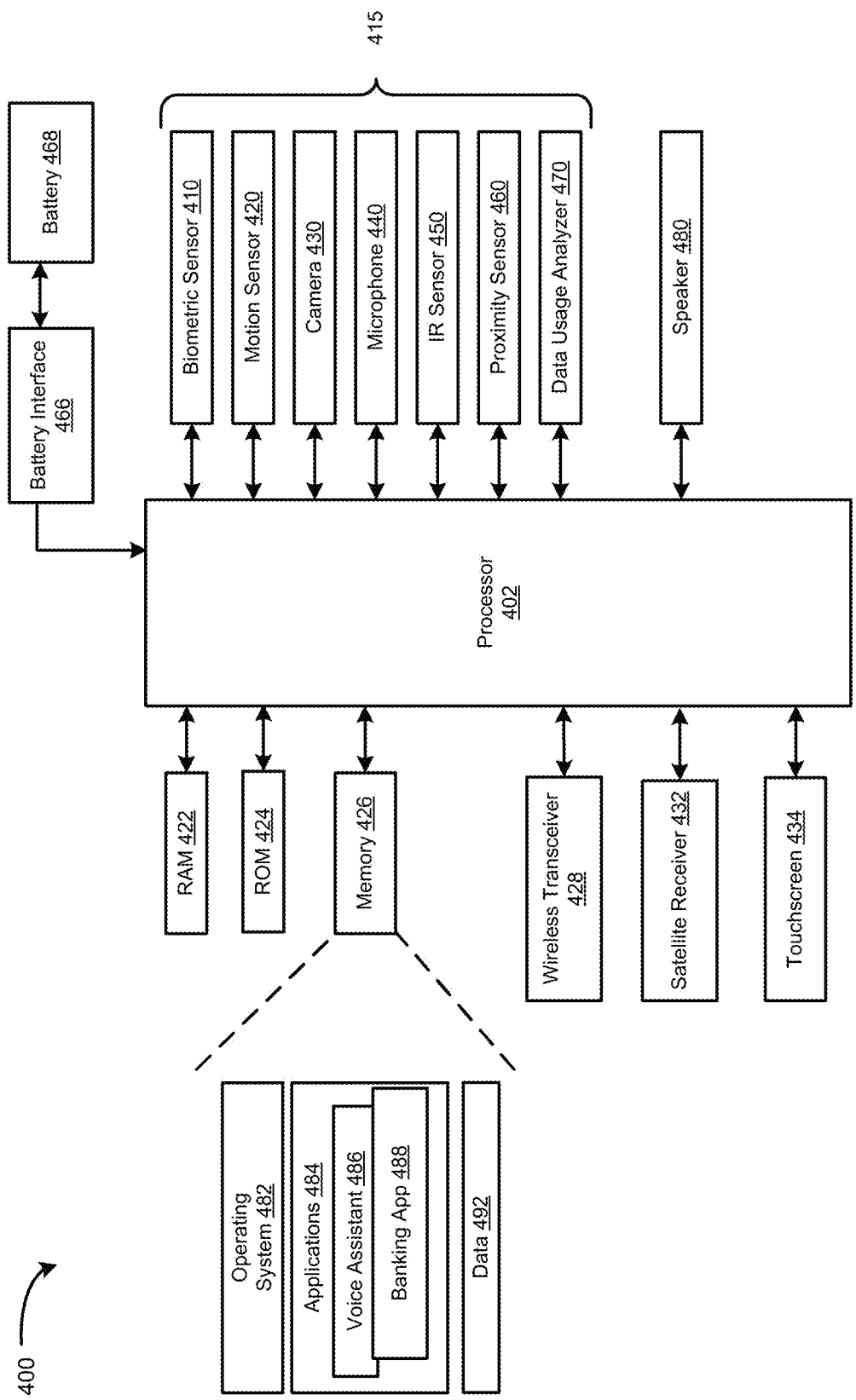
FIG. 2 is a block diagram of an electronic device suitable for communication with a voice assistant device in accordance with one example embodiment of the present disclosure.

Reference is next made to FIG. 2 which illustrates in simplified block diagram form an electronic device 400 suitable for communication with the voice assistant device 200 in accordance with one example embodiment of the present disclosure. The electronic devices 400 comprise a controller comprising at least one processor 402 (such as a microprocessor) which controls the overall operation of the electronic devices 400. The processor 402 is coupled to a plurality of components via a communication bus (not shown) which provides a communication path between the components and the processor 402.

Examples of the electronic devices 400 comprise, but are not limited to, handheld wireless communication devices, such as smartphones, tablets, laptop or notebook computers, netbook or ultrabook computers, vehicles having an embedded-wireless communication system, such as a Wi-Fi™ or cellular equipped in-dash infotainment system, or tethered to another wireless communication device having such capabilities. The mobile wireless communication devices may comprise devices equipped for cellular communication through PLMN or PSTN, mobile devices equipped for Wi-Fi™ communication over WLAN or WAN, or dual-mode devices capable of both cellular and Wi-Fi™ communication. In addition to cellular and Wi-Fi™ communication, the mobile wireless communication devices may also be equipped for Bluetooth™ and/or NFC communication. In various embodiments, the mobile wireless communication devices are configured to operate in compliance with any one or a combination of a number of wireless protocols, comprising GSM, GPRS, CDMA, EDGE, UMTS, EvDO, HSPA, 3GPP, or a variety of others. It will be appreciated that the mobile wireless communication devices may roam within and across PLMNs. In some instances, the mobile wireless communication devices are configured to facilitate roaming between PLMNs and WLANs or WANs, and are thus capable of seamlessly transferring sessions from a coupling with a cellular interface to a WLAN or WAN interface, and vice versa.

The processor 402 is coupled to RAM 422, ROM 424, persistent (non-volatile) memory 426 such as flash memory, one or more wireless transceivers 428 for exchanging radio frequency signals with a wireless network that is part of the communication network, a satellite receiver 432 for receiving satellite signals from a satellite network that comprises a plurality of satellites which are part of a global or regional satellite navigation system, and a touchscreen 434.

The electronic devices 400 comprise a number of sensors 415 coupled to the processor 402. The sensors 415 comprise a combination of a biometric sensor 410, a motion sensor 420, a camera 430, a microphone 440, an IR sensor 450, a proximity sensor 460, a data usage analyser 470, and possibly other sensors such as a satellite receiver for receiving satellite signals from a satellite network, orientation sensor, electronic compass or altimeter.

The wireless transceivers may comprise one or a combination of Bluetooth® transceiver or other short-range wireless transceiver, a Wi-Fi or other WLAN transceiver for communicating with a WLAN via a WLAN access point (AP), or a cellular transceivers for communicating with a radio access network (e.g., cellular network).

The electronic devices 400 comprise one or more output devices. The output devices comprise a speaker 480. The electronic devices 400 may also comprise one or more additional input devices such as buttons, switches, dials, a keyboard or keypad, or navigation tool, depending on the type of electronic device 400, one or more auxiliary output devices such as a vibrator or LED notification light, depending on the type of electronic device 400, or a data port such as serial data port (e.g., USB data port).

Operating system software 482 executed by the processor 402 is stored in the persistent memory 426 but may be stored in other types of memory devices, such as ROM 424 or similar storage element. A number of applications 484 executed by the processor 402 are also stored in the persistent memory 426. The memory 426 also stores a variety of data 492. The data 492 may comprise sensor data sensed by the sensors 242, user data comprising user preferences, settings and possibly biometric data about the user for authentication and/or identification (such as voice data, facial data, iris data, typing cadence data, heat signature data, etc.), a download cache comprising data downloaded via the wireless transceivers 428, and saved files. System software, software modules, specific device applications, or parts thereof, may be temporarily loaded into a volatile store, such as RAM 422, which is used for storing runtime data variables and other types of data or information. Communication signals received by the electronic devices 400 may also be stored in RAM 222. Although specific functions are described for various types of memory, this is merely one example, and a different assignment of functions to types of memory may be used in other embodiments.

The electronic devices 400 may also comprise a battery 468 as a power source, such as one or more rechargeable batteries that may be charged, for example, through charging circuitry coupled to a battery interface such as the serial data port. The battery 468 provides electrical power to at least some of the components of the electronic device 400, and the battery interface 466 provides a mechanical and electrical connection for the battery 468.

Figure 3:
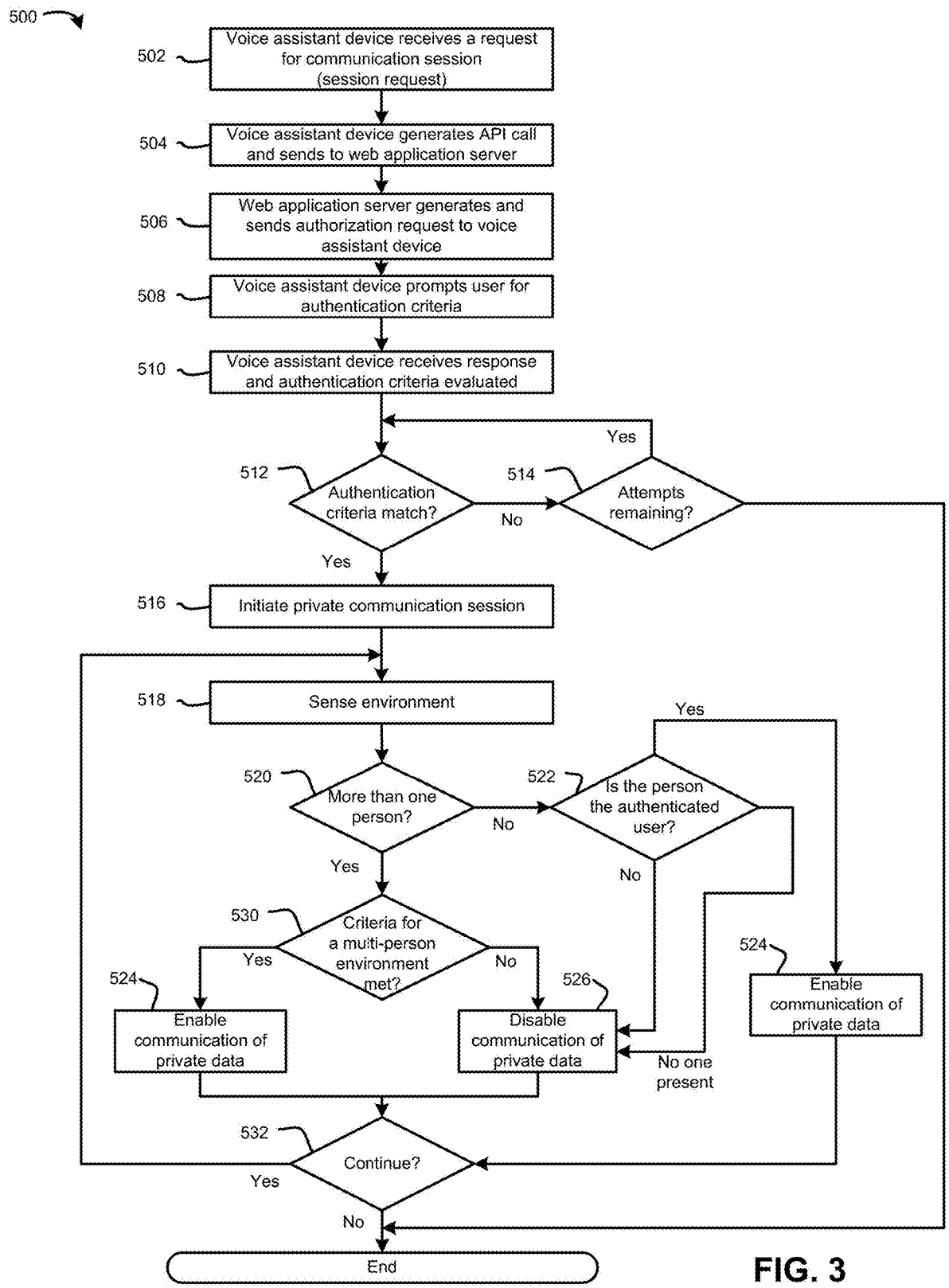
FIG. 3 is a flowchart illustrating a method of enforcing privacy during a communication session with a voice assistant on an electronic device in accordance with one example embodiment of the present disclosure.

Methods of Enforcing Privacy during a Communication Session with a Voice Assistant Referring next to FIG. 3, a method 500 of enforcing privacy during a communication session with a voice assistant in accordance with one example embodiment of the present disclosure will be described. The method 500 is performed by a voice assistant device 200 which, as noted above, may be a multipurpose communication device, such as a smartphone or tablet running a VA application, or a dedicated device, such as an IoT device (e.g., smart speaker or similar smart device).

At operation 502, a user inputs a session request for a private communication session with a voice assistant of a web application, such as a private banking session of a banking application of a financial institution to perform banking transactions, on the voice assistant device 200. The session request is made verbally by the user in the form of a voice input that is received by the microphone 240 of the voice assistant device 200. Alternatively, the session request may be input via another input device, such as a touchscreen, with the communication session with the web application to be performed verbally. Alternatively, the session request may be input via another electronic device 400 connected to the device 200, such as a wireless mobile communication device (e.g., smartphone, tablet, laptop computer or the like) wirelessly connected to the voice assistant device 200.

The processor 205 of the voice assistant device 200 receives and interprets the voice input, and the session request is detected by the voice assistant device 200. Interpreting the voice input by the voice assistant device 200 comprises performing speech recognition to identify one or more words in the voice sample, matching the one or more words to a command (or instruction) and optionally one or more parameters (or conditions) for executing the command depending on the matching command (or instruction). Interpreting the voice input by the voice assistant device 200 may also comprise voice recognition.

Speech recognition is the process of converting speech into words. Voice recognition is the process of identifying a person who is speaking. Voice recognition works by analyzing the features of speech that differ between individuals. Every person has a unique pattern of speech that results from anatomy (e.g., size and shape of the mouth and throat, etc.) and behavioral patterns (voice's pitch, speaking style such as intonation, accent, dialect/vocabulary, etc.). Speaker verification is a form of voice recognition in which a person's voice is used to verify the identity of the person. With a suitable sample of a user's speech, a person's speech patterns can be tested against the sample to determine if the voice matches, and if so, the person's identify is verified. Speaker identification is a form of voice recognition in which an unknown speaker's identity is determined by comparing a sample against a database of samples until a match is found.

At operation 504, the processor 205 of the voice assistant device 200 generates an API call for the session request. The API call is sent by the voice assistant device 200 to the voice assistant server 305 via the communication subsystem 225, typically via wireless transceivers. The voice assistant server 305 forwards the API call to the web application server 315 providing the web application and its communication service, such as the banking session for the banking application of the financial instruction. Alternatively, in other embodiments the API call is sent by the voice assistant device 200 directly to the web application server 315 without a voice assistant server 305.

At operation 506, the authorization server API 325 of the web application server 315 generates a user authentication request in response to the session request, and sends the user authentication request to the voice assistant device 200 via the voice assistant server 305. The web application server 315 typically requires a specific form of user authentication. However, the web application server 315 could permit user authentication in one of a number of approved forms of user authentication. User authentication may be performed via user credentials, such as a combination of user name and shared secret (e.g., password, passcode, PIN, security question answers or the like), biometric authentication, a digital identifier (ID) protocol or a combination thereof among other possibilities.

The web application server 315 may send the user authentication request to the voice assistant device 200 indirectly via the voice assistant server 305 when user authentication is to be provided by voice input via the microphone 240 or directly when the user authentication can be provided by other means, such as an alternative input device on the voice assistant device 200 such as a biometric sensor 210, camera 230, or input device touchscreen or keyboard.

At operation 508, the voice assistant device 200 prompts the user to authenticate themselves via one or more first criteria using an identification process. The one or more first criteria may comprise a shared secret and one or more biometric factors, as described more fully below. The prompt is typically an audible announcement via the speaker 245 but could be via a display of the voice assistant device 200 depending on the capabilities and configuration of the voice assistant device 200.

At operation 510, the user provides input for authentication that is sent to the authorization server API 325 for verification either directly or indirectly via the voice assistant server 305. Alternatively, the verification could be performed locally on the voice assistant device 200. This may be preferable when the one or more first criteria comprises biometric factors, such as voice or facial recognition, for increased security by ensuring that biometric data, such as biometric samples, biometric patterns and/or biometric matching criteria used for comparison, are stored locally. The local storage of biometric data reduces the likelihood that biometric data may be exposed compared with storing biometric data on the authorization server API 325 which is more likely to be hacked or otherwise compromised.

The one or more first criteria may comprise a shared secret and one or more biometric factors acquired during the input via a keyboard of the voice assistant device 200 in some examples. This is sometimes known as multi-form criteria. The biometric factors may comprise typing cadence, fingerprint recognition, voice recognition, facial recognition, or a combination thereof. Typing cadence may be captured by a hardware or software (virtual) keyboard. Fingerprints may be captured by a fingering sensor which may be embedded within an input device such as a home button of the voice assistant device 200 or touchscreen of the voice assistant device 200 when the keyboard is a software keyboard. Voice samples for voice recognition may be captured by a microphone of the voice assistant device 200, sensors 110 in the local environment, or possibly a connected electronic device 400 such as the user's smartphone. Images for facial recognition may be captured by a camera of the voice assistant device 200, sensors 110 in the local environment, or possibly a connected electronic device 400 such as the user's smartphone.

At operation 512, the authorization server API 325 attempts to verify the received user input to authenticate the user.

If the user input does not match stored authentication criteria, authentication fails and a notification is sent to the voice assistant device 200 either directly or indirectly, for example via the voice assistant server 305 (operation 514). The notification concerning the results of the authentication process is provided to the user via the voice assistant device 200, typically by an audible notification via the speakers 245 but possibly via a display of the voice assistant device 200 depending on the capabilities and configuration of the voice assistant device 200. The user may be prompted to try again in response to a failed authentication, possibly up to a permitted number of attempts before a lockout or other security measure is performed, for example by the voice assistant device 200 and/or authorization server API 325.

At operation 514, the authorization server API 325 determines if any attempts in the permitted number of attempts are remaining (e.g., is the number of attempts <n, where n is the permitted number of attempts). If one or more attempts in the permitted number of attempts are remaining, the voice assistant device 200 again prompts the user to authenticate themselves. If no attempts are remaining, the method 500 ends.

Alternatively, or in addition to restricting the permitted number of attempts, the authorization server API 325 may determine (e.g., calculate) a probability (or confidence level) of fraudulent activity during the authentication/authorization process. The determination of a probability of fraudulent activity may be performed in a variety of ways including but not limited to checking a biofactor during user input, e.g., typing cadence or fingerprint during input of a shared secret via a hardware or software keyboard or voice recognition during input of a shared secret via a speech recognition. In addition to, or instead of checking a biofactor, the determination of a probability of fraudulent activity may be based on a software daemon (e.g., background software service or agent) that monitors for and detects malicious software attempting to bypass or circumvent the authentication/authorization process. If the determined probability of fraudulent activity exceeds a fraudulent activity threshold, the number of remaining attempts may be reduced by a predetermined amount, which may depend on the determined probability of fraudulent activity. For example, if the determined probability of fraudulent activity exceeds 35% but is less than 50%, the number of remaining attempts may be reduced by 1 or 2 attempts, whereas if the determined probability of fraudulent activity exceeds 50%, the number of remaining attempts may be reduced by 5 attempts or to no remaining attempts.

If the user input matches stored authentication criteria, authentication is successful, a notification is sent to the voice assistant device 200 either directly or indirectly, for example via the voice assistant server 305, and the communication session with the voice assistant is initiated in response to the successful authentication of the user (operation 516). In response to successful authentication, the user may be notified that a private communication session has been initiated with the user's private data (such as banking and/or personal information) and may provide the user with instructions to assist in ensuring that the local environment 101 of the user is private. The meaning of the term "private" may vary depending on the embodiment. The term "private" may mean that (i) the authenticated user is alone in the local environment 101, (ii) that more than one person is present in the local environment 101 but that any other persons in the local environment 101 other than the authenticated user are authorized users (i.e., only authorized persons are present in the local environment 101), (iii) that more than one person is present in the local environment 101 but that any other persons in the local environment 101 other than the authenticated user are authorized users and are more than a threshold distance away (e.g., other authorized users are permitted with the threshold distance), or (iv) that any additional persons other than the authenticated user are more than a threshold distance away regardless of whether such users are authorized users, depending on the embodiment, as described more fully below.

At one or more times after the communication session with the voice assistant has been initiated, the privacy of the vicinity around the authenticated user/voice assistant device 200 is determined by the voice assistant device 200. That is, the voice assistant device 200 determines whether the vicinity (i.e., the local environment 101) around the authenticated user/voice assistant device 200 is private. This comprises collecting and analyzing sensor data acquired by one or more sensors 110 in the local environment, incorporated within the voice assistant device 200, or possibly incorporated within a connected electronic device 400 such as a user's smartphone. The voice assistant device 200 may also determine whether the local environment 101 around the authenticated user/voice assistant device 200 is private before initiating the communication session in some embodiments.

The privacy of the environment 101 may be determined before or at the start of the communication session and at regular intervals thereafter, possibly continuously or substantially continuously. The term "continuously" means at every opportunity or sample, which may vary depending on the sensor data used to determine the privacy of the environment 101 and the capabilities of the device analysing the sensor data. For example, if the privacy of the environment 101 is determined by voice recognition, privacy may be determined at each voice sample/voice input received by the voice assistant device 200. A voice sample/input may be a discrete input, such as a command or instruction by the user or response, a sentence, a word or suitably sized voice sample, depending on the capabilities of the device analysing the sensor data.

At operation 518, to determine the privacy of the environment 101, sensor data is acquired by one or more sensors, which may be fixed or mobile depending on the nature of the sensors, such as the host device. The sensors may comprise one or more sensors of the plurality of sensors 215, one or more sensors in the plurality of sensors 110 located in the environment 101, one or more sensors 415 of a connected electronic device 400 such as user's smartphone, or a combination thereof. The processor 205 processes the sensor data acquired by the sensors 110, 215, and/or 415 to determine whether a person is present in the local environment 101 and/or a number of persons present in the local environment 101 of the voice assistant device 200 via one or more second criteria (operation 520). Alternatively, the sensor data may be sent to a remote server for processing.

The one or more second criteria may comprise multiple factors to provide multifactor privacy monitoring. For example, voice recognition and object (person) recognition or facial recognition may be performed to determine a number of persons, and optionally to verify and/or identify those persons. The use of secrets (such as a password, passcode, PIN, security question answers or the like) in combination with biometrics is advantageous in that biometrics may be publically exposed and can be detected by determined attackers. Thus, multi-form criteria, such as two-form criteria comprising secrets and biometrics, may be used for the one or more second criteria to determine a number of persons and optionally to verify and/or identify those persons. Two-form criteria comprising secrets and biometrics may also be used as the one or more first criteria to authenticate the user, as described above.

The one or more second criteria used to determine whether a person is present in the local environment 101 and/or a number of persons in the local environment 101 of the voice assistant device 200 may be different from the one or more first criteria used to authenticate the user to increase security. For example, the one or more first criteria may be user credentials, such as a username and shared secret, and the one or more second criteria may be a biometric factor. For another example, the one or more first criteria may be user credentials and one or more biometric factors whereas the one or more second criteria may be one or more different biometric factors. For a further example, the one or more first criteria may be user credentials and one or more biometric factors whereas the one or more second criteria may be the biometric factors of the one or more first criteria.

The sensor data used to determine whether a person is present in the local environment 101 and/or a number of persons in the environment may comprise one or a combination of a facial data, voice data, IR heat sensor data, movement sensor data, device detection event data, wireless (or wired) device usage data or other data, depending on the embodiment. The use of voice recognition and possibly other factors is advantageous because voice samples are regularly being gathered as part of the communication session with the voice assistant. Therefore, in at least some embodiments the sensor data comprises voice data.

The sensor data is analyzed by comparing the acquired data to reference data to determine a number of discrete, identified sources. For one example, the sensor data may be used to determine whether a person is present in the local environment 101 and/or a number of persons present in the local environment by performing object (person) recognition on images captured by the camera 130, 230 and/or 430.

For another example, the sensor data may be used to determine whether a person is present in the local environment 101 and/or a number of faces present in images captured by the camera 130, 230 and/or 430 by performing facial recognition on images captured by the camera 130, 230 and/or 430, with unique faces being a proxy for persons.

For yet another example, the sensor data may be used to determine whether a person is present in the local environment 101 and/or a number of voices in audio samples captured by the microphone 140, 240 and/or 440 by performing voice recognition on audio samples captured by the microphone 140, 240 and/or 440, with unique voices being a proxy for persons.

For yet another example, the sensor data may be used to determine whether a person is present in the local environment 101 and/or a number of persons present in the local environment 101 by identifying human heat signatures in IR image(s) captured by the IR sensor 150, 250 and/or 450 by comparing the IR image(s) to a human heat signature profile via heat pattern analysis, with human heat signatures being a proxy for persons.

For yet another example, the sensor data may be used to determine whether a person is present in the local environment 101 and/or a number of persons present in the local environment 101 by identifying a number sources of movements in motion data captured by the motions sensor 120, 220 and/or 420 by comparing the motion data to a human movement profile via movement analysis, with human heat signatures being a proxy for persons.

For yet another example, the sensor data may be used to determine whether a person is present in the local environment 101 and/or a number of persons present in the local environment 101 by detecting wireless communication devices in the local environment 101 and determining the number of wireless communication devices, with unique wireless communication devices being a proxy for persons. The wireless communication devices may be smartphones in some embodiments. The wireless communication devices may be detected in a number of different ways. The wireless communication devices may be detected by the voice assistant device 200, connected electronic device 400 or sensor array 110 when the wireless communication devices are connected to a short-range and/or long-range wireless communication network in the local environment 101 using suitable detecting means. For example, the wireless communication devices may be detected by detecting the wireless communication devices on the short-range and/or long-range wireless communication network, or by detecting a beacon message, broadcast message or other message sent by the wireless communication devices when connecting to or using the short-range and/or long-range wireless communication network via a short-range and/or long-range wireless communication protocol (e.g., RFID, NFC™, Bluetooth™, Wi-Fi™, cellular, etc.) when the wireless communication devices are in, or enter, the local environment 101. The message may be detected by a sensor or communication subsystem of the voice assistant device 200 (such as the communication subsystem 225 or data usage monitor and analyzer 270), electronic device 400 or sensor array 110.

The wireless communication devices in the local environment 101 can be identified by a device identifier (ID) in the transmitted message, such as a media access control (MAC) address, universally unique identifier (UUID), International Mobile Subscriber Identity (IMSI), personal identification number (PIN), etc., with the number of unique device IDs being used to determine the number of unique wireless communication devices.

The privacy module, to determine the number of persons in the local environment 101, monitors for and detects wireless communication devices in the local environment 101 of the voice assistant device 200, each wireless communication device in the local environment of the voice assistant device 200 being counted as a person in the local environment 101 of the voice assistant device 200. The count of the number of devices in the local environment 101 of the voice assistant device 200 may be adjusted to take into account electronic devices 400 of the authenticated user, for example, using the device ID of the electronic devices 400. The device ID of the electronic devices 400 may be provided in advance, for example, during a setup procedure, so that electronic devices 400 of the authenticated user are not included in the count of the number of devices in the local environment 101 of the voice assistant device 200, or are deduced from the count when present in the local environment 101 of the voice assistant device 200.

For yet another example, the sensor data may be used to determine whether a person is present in the local environment 101 and/or a number of persons present in the local environment 101 by identifying a number of active data users (as opposed to communication devices, which may be active with or without a user) by performing data usage analysis on the data usage information captured by the data usage monitor and analyzer 270, with active data users being a proxy for persons.

When one person is present in the local environment 101 of the voice assistant device 200, the sensor data is processed to identify (or attempt to identify) the one person and determine whether the one person is the authenticated user based on whether the one person is identified as the authenticated user (operation 522). In some embodiments, voice recognition and optionally facial recognition or other biometric factors are used to identify the person. Voice recognition is advantageous because voice samples are regularly being gathered as part of the communication session with the voice assistant. The voice assistant device 200 may use the previously sensed data and the one or more first criteria to identify (or a subset of the one or more first criteria to identify (or attempt to identify) the person, or acquire new sensor data to identify (or attempt to identify) the one person. For example, the voice assistant device 200 may use voice recognition and optionally facial recognition as one or more second criteria to identify the person while using a shared secret and optionally a biometric factor as the one or more first criteria to authenticate the user.

When the one person in the local environment 101 of the voice assistant device 200 is determined to be the authenticated user, communication of private data by the voice assistant is enabled (operation 524). When the one person in the local environment 101 of the voice assistant device 200 is determined not to be the authenticated user, communication of private data by the voice assistant is disabled (operation 526). The data that is considered to be private data is determined by business rules of the authorization server API 325 and/or resource server API 335, which may vary between embodiments. For example, in some embodiments private data may comprise all banking data and personal data associated the authenticated user whereas non-private data may comprise information not associated with any user, such as local branch information (e.g., address and business hours), general contact information (e.g., toll free telephone number), etc.

When no one is present in the local environment 101 of the voice assistant device 200, communication of private data by the voice assistant may also be disabled (operation 526).

When more than one person is present in the local environment 101 of the voice assistant device 200, the sensor data is processed to determine whether the local environment 101 of the voice assistant device 200 matches one or more predetermined privacy criteria for a multi-person environment (operation 530). The one or more predetermined privacy criteria for a multi-person environment may involve assessing whether the local environment 101 is "private". The term "private" in the context of a multi-person environment may be that only authorized persons are present, that unauthorized persons are more than a threshold distance away, or that any persons other than the authorized users are more than a threshold distance away, as described more fully below. The one or more predetermined privacy criteria for a multi-person environment may comprise each person in the local environment 101 of the voice assistant device 200 being an authorized user, each person other than the authenticated user being more than a threshold distance from the authenticated user, or a combination thereof (i.e., any person within the threshold distance must be an authorized user).

The assessment of whether the multi-person environment is "private may consider the geolocation of the voice assistant device 200. In some examples, if the geolocation of the multi-person environment is "private", other persons may be present but if the geolocation of the multi-person environment is not "private", no other persons may be present. In some examples, if the geolocation of the multi-person environment is "private", other persons may be present only if each person in the local environment 101 of the voice assistant device 200 is an authorized user whereas in other examples the other persons need not be an authorized user.

The voice assistant device 200 may use GPS data, or triangulation via cellular or WLAN access, to determine its geolocation if unknown, and determine whether the geolocation is "private". The determination of whether the determined geolocation is "private" may comprise comparing the determined geolocation to a list of geolocation designated as "private", and determining whether the determined geolocation matches a "private" geolocation. A determined geolocation may be determined to match a "private" geolocation when it falls within a geofence defined for the "private"

geolocation. A geofence is a virtual perimeter defined by a particular geographic area using geo-spatial coordinates, such as latitude and longitude. The "private" geolocations may be a room or number of rooms of a house, hotel, apartment of condo building, an entire house, a hotel, or apartment of condo building, a vehicle, or other comparable location. The determined geolocations and "private" geolocations are defined in terms of a geographic coordinate system that depends on the method of determining the geolocation. A common choice of coordinates is latitude, longitude and optionally elevation. For example, when GPS is used to determine the geolocation, the geolocation may be defined in terms of latitude and longitude, the values of which may be specified in one of a number of different formats including degrees minutes seconds (DMS), degrees decimal minutes (DDM), or decimal degrees (DD).

Whether a particular geolocation is private may be pre-set by the user or a third party service such as the voice assistant server 305 and a web application server 315. Alternatively, whether a particular geolocation is private may be determined dynamically in real-time, for example, by the voice assistant device 200, voice assistant server 305 or web application server 315, or possibly by prompting a user, depending on the embodiment. Each "private" geolocation may have a common name for easy identification by a user, such as "home", "work", "school", "car", "Mom's house", "cottage", etc. When the "private" geolocation is a mobile location such as a vehicle, the geofence that defines the "private" geolocation is determined dynamically. Additional factors may be used to identify or locate a mobile location, such as a smart tag (e.g., NFC tag or similar short-range wireless communication tag), wireless data activity, etc.

In operation 530, determining whether the local environment 101 of the voice assistant device 200 matches one or more predetermined privacy criteria for a multi-person environment, may be implemented in a variety of ways. The voice assistant device 200, when more than one person is present in the local environment 101 of the voice assistant device 200, may sense the local environment 101 of the voice assistant device 200 via the plurality of sensors 110, 215 or 415 to generate sensed data. The sensed data may comprise motion data from motion sensors 120, 220 or 420, images from cameras 130, 230 or 430, audio samples from the microphones 140, 240 or 440, IR data from IR sensors 150, 250 or 450, proximity data from proximity sensors 160, 260 or 460, or a combination thereof.

Figure 8:
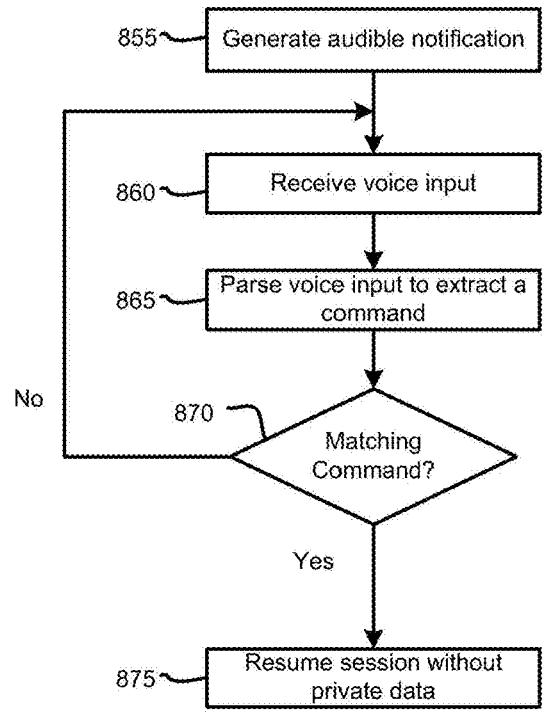
FIG. 8 is a flowchart illustrating a method of handling private data when a local environment of an electronic device is determined to be non-private in accordance with a yet further example embodiment of the present disclosure.
Figure 9:
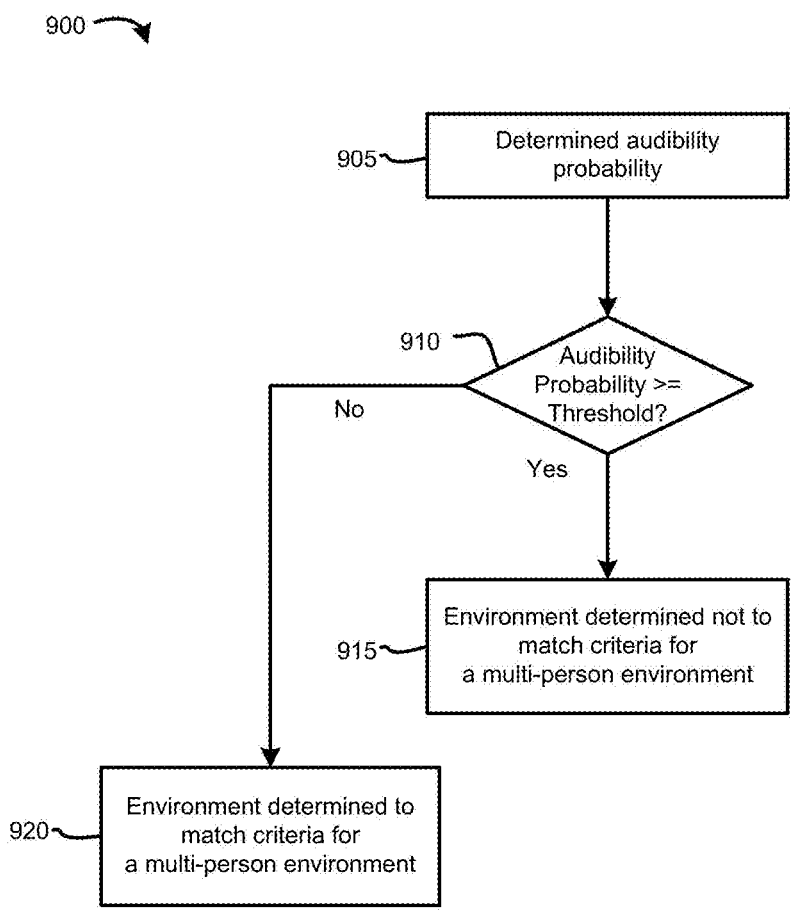
FIG. 9 is a flowchart illustrating a method for determining whether the local environment of an electronic device matches one or more predetermined privacy criteria for a multi-person environment in accordance with one example embodiment of the present disclosure.

Referring to FIG. 9, one embodiment of a method 900 for determining whether the local environment 101 of the voice assistant device 200 matches one or more predetermined privacy criteria for a multi-person environment in accordance with the present disclosure will be described. The method 900 presents one method of accommodating multiple people in an environment, such as multiple people living in a home. In operation 905, a probability (or confidence level) that private information audibly communicated by the voice assistant device 200 may be heard by any of the other persons present in the local environment 101 (e.g., the one or more additional persons in the vicinity of the authenticated user) is determined (e.g., calculated) using the sensed data. The probability, known as an audibility probability, is used by the voice assistant device 200 as a threshold to determine whether the communication session should end or whether some action should be taken for handling private data when the local environment 101 of the voice assistant device 200 is determined to be non-private, as described more fully below in connection with FIG. 5-8. The determination that private information audibly communicated by the voice assistant device 200 may be heard by any of the other persons present in the local environment 101 may be performed in a variety of ways, examples of which are described below.

In operation 910, the voice assistant device 200 compares the determined audibility probability to an audibility probability threshold. The audibility probability threshold may vary between embodiments. The audibility probability threshold may vary based on a privacy setting (or rating) or security setting (or rating) for the communication session or the application associated therewith. For example, if the communication session or application associated therewith has a privacy setting of "high" (e.g., for a banking communication session for a banking application), a lower audibility probability threshold may be used than if the communication session or application associated therewith had a privacy setting of "low". In this way a stricter standard is applied if the communication session or application associated therewith has more private or sensitive data. "high"

The audibility probability threshold may vary based on the number and/or type of sensor data use to determine the audibility probability. For example, when more than one type of sense data is used to determine the audibility probability, the accuracy of the audibility probability may be increased and a lower audibility probability may be used. For one example, if audio data captured by a microphone and image data captured by a camera are used to determine the audibility probability, a lower audibility probability threshold may be used than if only image data is used to determine the audibility probability. For another example, if audio data captured by a microphone is used to determine the audibility probability, a lower audibility probability threshold may be used than if image data captured by a camera is used to determine the audibility probability because audio data is more accurate.

At operation 915, when the audibility probability is determined to be greater than or equal to an audibility probability threshold, the local environment 101 of the voice assistant device 200 is determined not to match the one or more predetermined privacy criteria for a multi-person environment.

At operation 920, when the audibility probability is determined to be less than the audibility probability threshold, the local environment 101 of the voice assistant device 200 is determined to match the one or more predetermined privacy criteria for a multi-person environment.

The voice assistant device 200 may generate a three-dimensional (3D) model of the local environment 101 using the sensed data in the operation 530 as part of a method of determining whether private information audibly communicated by the voice assistant device 200 may be heard by any of the other persons present in the local environment 101. In one example in which the sensed data comprises images from cameras 130 or 230. The voice assistant device 200 acquires, via the one or more cameras 130 or 230, one or more images of the local environment 101 of the voice assistant device 200. The cameras 130 or 230 may be stereoscopic cameras, omnidirectional cameras, rotating cameras, or a 3D scanner. One or more reference points in the one or more images of the local environment 101 of the voice assistant device 200 are identified by the processor 205. A distance to the one or more reference points is determined by the processor 205 via proximity data sensed by the one or more proximity sensors 160 or 260. A 3D model of the local environment 101 of the voice assistant device 200 is determined using the one or more images and the distance to the one or more reference points.

In another example in which the sensed data comprises images audio samples from the microphones 140 or 240, the voice assistant device 200 generates, via the speaker 245, a multi-tone signal. The voice assistant device 200 receives, via the microphone 140 or 240, a reflected multi-tone signal. A 3D model of the local environment 101 of the voice assistant device 200 is generated by the processor 205 using the multi-tone signal and the reflected multi-tone signal.

After the 3D model of the local environment 101 of the voice assistant device 200 is generated using one of the approaches described above or other suitable process, an audio profile of the local environment 101 is generated based on the three-dimensional model and an audio sample of the local environment 101. The audio profile defines a sound transmission pattern within the local environment 101 given its 3D shape as defined by the 3D model of the local environment 101. The audio profile of the local environment is based on the 3D model and an audio sample of the local environment 101.

Next, an audible transmission distance of the voice of the authenticated user is determined based on the audio profile of the local environment 101 as the threshold distance. The audible transmission distance determines a distance from the authenticated user within which the voice of the authenticated user is discernable to other persons in the local environment 101. The audible transmission distance of the voice of the authenticated user is based on the audio profile and one or more characteristics of the voice of the authenticated user, such as voice's pitch, speaking style such as intonation, accent, dialect/vocabulary, etc.

Next, all persons in the local environment 101 are localized via the sensed data, i.e. a relative position of the persons in the local environment 101 is determined. Lastly, for each person other than the authenticated user, a distance of the person from the authenticated user is determined. When the distance of one or more other persons from the authenticated user is more than the audible transmission distance, the local environment 101 of the voice assistant device 200 is determined not to match the one or more predetermined privacy criteria for a multi-person environment (i.e., the local environment 101 is determined to be non-private). When the distance of each of other persons from the authenticated user is less than the audible transmission distance, the local environment 101 of the voice assistant device 200 is determined to match the one or more predetermined privacy criteria for a multi-person environment (i.e., the local environment 101 is determined to be private). Alternatively, an audibility probability may be determined (i.e., calculated) based on the distance of the person from the authenticated user and the the audible transmission distance and tested against an audibility probability threshold as described above in connection with FIG. 9. The audibility probability may be a relative measure of the distance of each person from the authenticated user and the audible transmission distance, such as a percentage.

When the local environment 101 of the voice assistant device 200 is determined to match the one or more predetermined privacy criteria for a multi-person environment, communication of private data by the voice assistant is enabled (operation 524). When the local environment 101 of the voice assistant device 200 is determined not to match the one or more predetermined privacy criteria for a multi-person environment, communication of private data by the voice assistant is disabled (operation 526).

The method 500 ends when the communication session ends or the number of permitted authorization attempts is reached (operation 532). Otherwise, the method 500 continues with the voice assistant device 200 sensing the environment 101 and evaluating the results at regular intervals to determine whether the communication session is private.

The voice assistant device 200 sends the result of the privacy analysis and determination to the web application server 315 directly or indirectly via the voice assistant server 305. When the local environment 101 of the voice assistant device 200 is determined to be private, the web application server 315 generates session token which is sent to the voice assistant server 305 to authorize the voice assistant of the voice assistant server 305 to access private data stored by the authorization server API 325 and/or resource server API 335, such as banking information. The session token may expire after a predetermined time interval so that, if a subsequent privacy check fails, the security token will no longer be valid and the voice assistant server 305 will no longer access to private data stored by the authorization server API 325 and/or resource server API 335. The time interval for which the security token is valid may be very short to facilitate continuous privacy monitoring.

Figure 5:
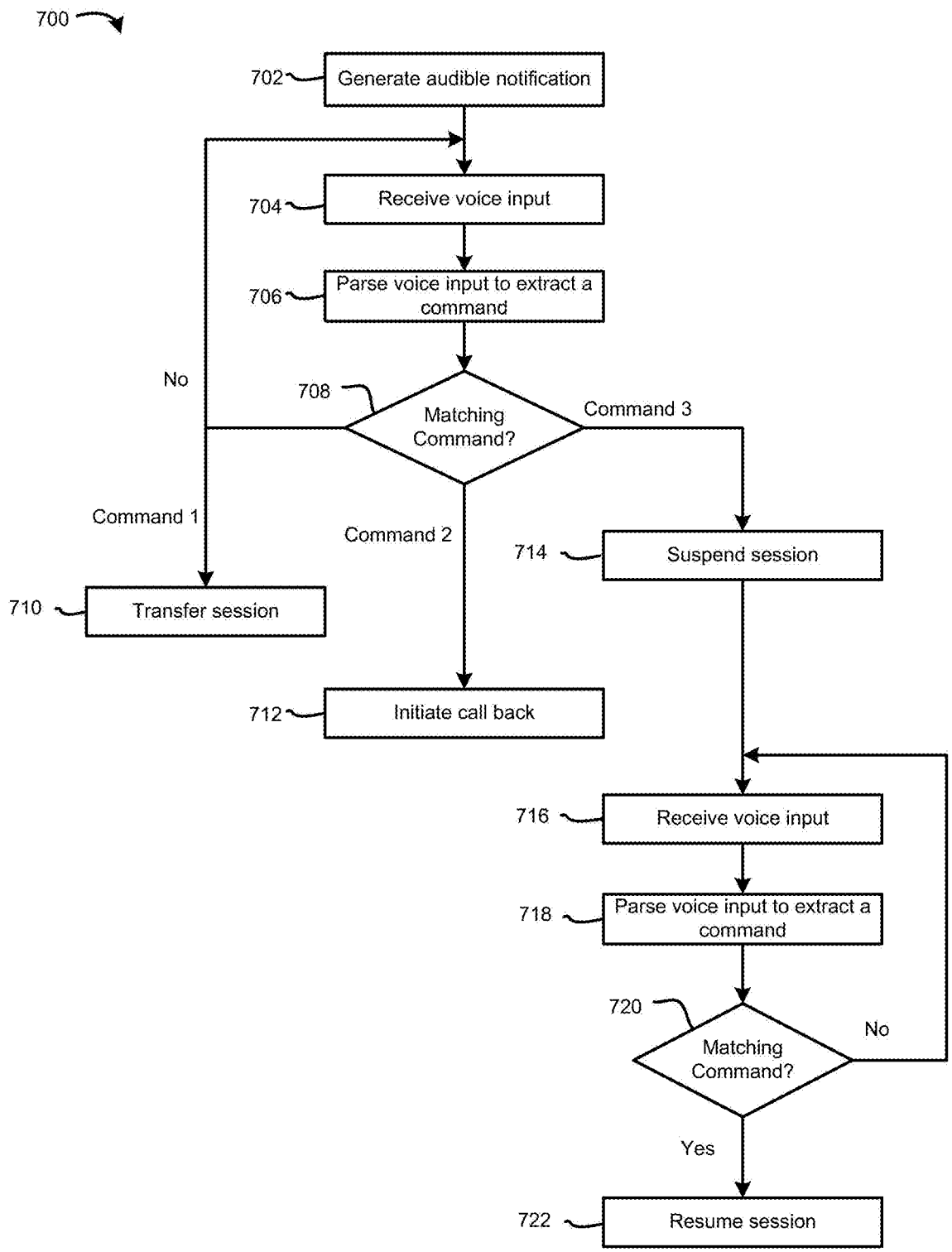
FIG. 5 is a flowchart illustrating a method of handling private data when a local environment of an electronic device is determined to be non-private in accordance with one example embodiment of the present disclosure.

Referring next to FIG. 5, a method 700 of handling private data when the local environment 101 of the voice assistant device 200 is determined to be non-private will be described. The method 700 is performed by a voice assistant device 200 which, as noted above, may be a multipurpose communication device, such as a smartphone or tablet running a VA application, or a dedicated device, such as an IoT device (e.g., smart speaker or similar smart device). The local environment 101 of the voice assistant device 200 may be determined to be non-private in a number of ways, as described herein. For example, the local environment 101 of the voice assistant device 200 may be determined to be non-private in that more than one person is determined to be in the local environment, when one person is determined to be in the local environment 101 of the voice assistant device 200 but that one person is determined not to be the authenticated user, or when the local environment of the electronic device is determined not to match the one or more predetermined privacy criteria for a multi-person environment.

The voice assistant device 200 generates, via the speaker 245 of the voice assistant device 200, an audible notification that the communication session is not private (operation 702). The notification may comprise a voice prompt whether to continue the communication session via a different channel or continue the communication session from a private location, such as a call back, transfer of the communication session to another electronic device 400, such as a mobile phone, or suspending the communication session so that the user can relocate.

The voice assistant device 200 receives a voice input via the microphone 240 (operation 704). The processor 205 parses, via speech recognition, the voice input to extract a command to be performed from a plurality of commands (operation 706). The processor 205 then determines a matching command (operation 708). The voice assistant device 200 transfers the communication session to a second electronic device 400 in response to the voice input containing a first command (operation 710). The voice assistant device 200 initiates a call back to a designated telephone number in response to the voice input containing a second command, and ends the communication session (operation 712). The voice assistant device 200 temporarily suspends the communication session in response to the voice input containing a third command (operation 714).

While the communication session is temporarily suspended, the voice assistant device 200 may receive a voice input via the microphone 240 (operation 716). Next, the voice assistant device 200 parses, via speech recognition, the voice input to extract a command to be performed from a plurality of commands (operation 718). The processor 205 then determines a matching command (operation 720). The voice assistant device 200 may resume the communication session from the temporary suspension in response to the voice input containing a corresponding command (operation 722).

Figure 6:
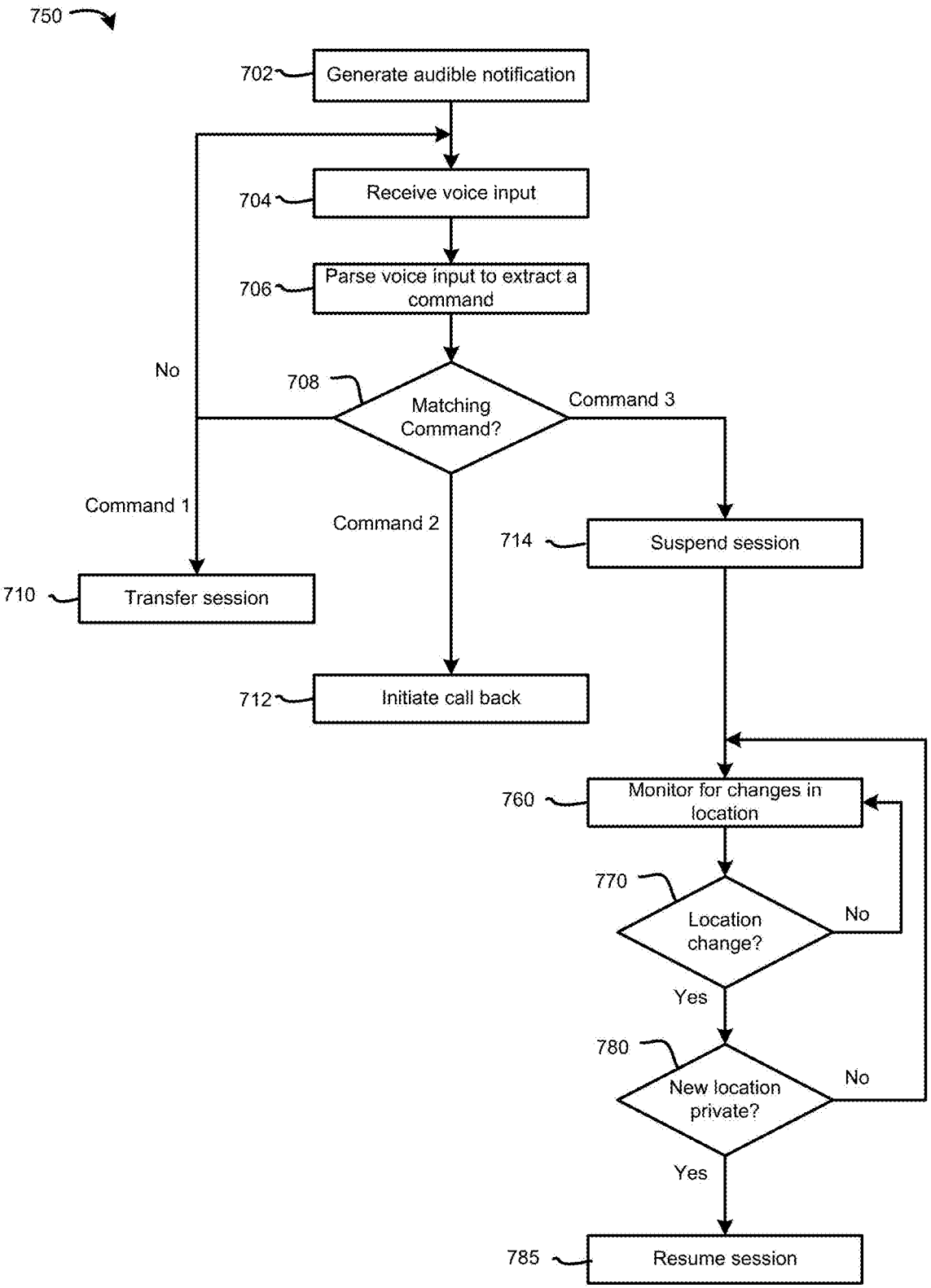
FIG. 6 is a flowchart illustrating a method of handling private data when a local environment of an electronic device is determined to be non-private in accordance with another example embodiment of the present disclosure.

FIG. 6 illustrates another embodiment of a method 750 of handling private data when the local environment 101 of the voice assistant device 200 is determined to be non-private will be described. The method 800 is similar to the method 700 except that while the communication session is temporarily suspended, the voice assistant device 200 monitors for changes in the location of the voice assistant device 200 (operation 760). When the voice assistant device 200 has moved more than a threshold distance (operation 770), the voice assistant device 200 determines whether the authenticated user has moved to a private location (operation 780). The voice assistant device 200 may automatically resume the communication session from the temporary suspension in response to a determination that the authenticated user has moved to a private location (operation 785). The determination that a location is a private location is based on location data, such as satellite-based location data (e.g., GPS data) or location data derived from sensor data such as proximity data. A location may be determined to be a private location if it is an enclosed room, a designated room or set or location (which may be defined by a set of predefined GPS locations), a new location that is at least a threshold distance from the location at which it was determined that the communication session is not private, among other possibilities.

Figure 7:
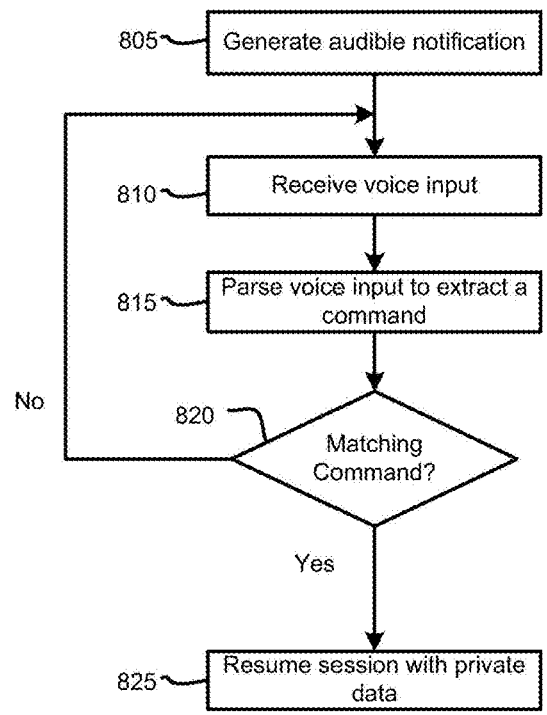
FIG. 7 is a flowchart illustrating a method of handling private data when a local environment of an electronic device is determined to be non-private in accordance with a further example embodiment of the present disclosure.

FIG. 7 illustrates a further embodiment of a method 800 of handling private data when the local environment 101 of the voice assistant device 200 is determined to be non-private will be described. The voice assistant device 200 generates, via the speaker 245 of the voice assistant device 200, an audible notification that the communication session is not private and comprises a voice prompt whether to continue communication of private data even though the communication session is not private (operation 805). The voice assistant device 200 receives a voice input via the microphone 240 (operation 810). The processor 205 parses, via speech recognition, the voice input to extract a command to be performed from a plurality of commands (operation 815). The processor 205 then determines a matching command (operation 820). The voice assistant device 200 re-enables the communication of private data in response to the voice input containing a corresponding command (operation 825). This allows the user to continue communication of private data even though the communication session is not private, with the user bearing the security risks associated therewith.

FIG. 8 illustrates a yet further embodiment of a method 850 of handling private data when the local environment 101 of the voice assistant device 200 is determined to be non-private will be described. The voice assistant device 200 generates, via the speaker 245 of the voice assistant device 200, an audible notification that the communication session is not private and comprises a voice prompt whether to continue the communication session with only non-private data (operation 855). The voice assistant device 200 receives a voice input via the microphone 240 (operation 860). The processor 205 parses, via speech recognition, the voice input to extract a command to be performed from a plurality of commands (operation 865). The processor 205 then determines a matching command (operation 870). Next, the voice assistant device 200 may terminate the communication session in response to the voice input containing a corresponding command, or continue the communication session in response to the voice input containing a corresponding command (operation 875).

The methods 700, 750, 800 and 850 described above that may be performed whenever the local environment 101 of the voice assistant device 200 is determined to be non-private.

Figure 4:
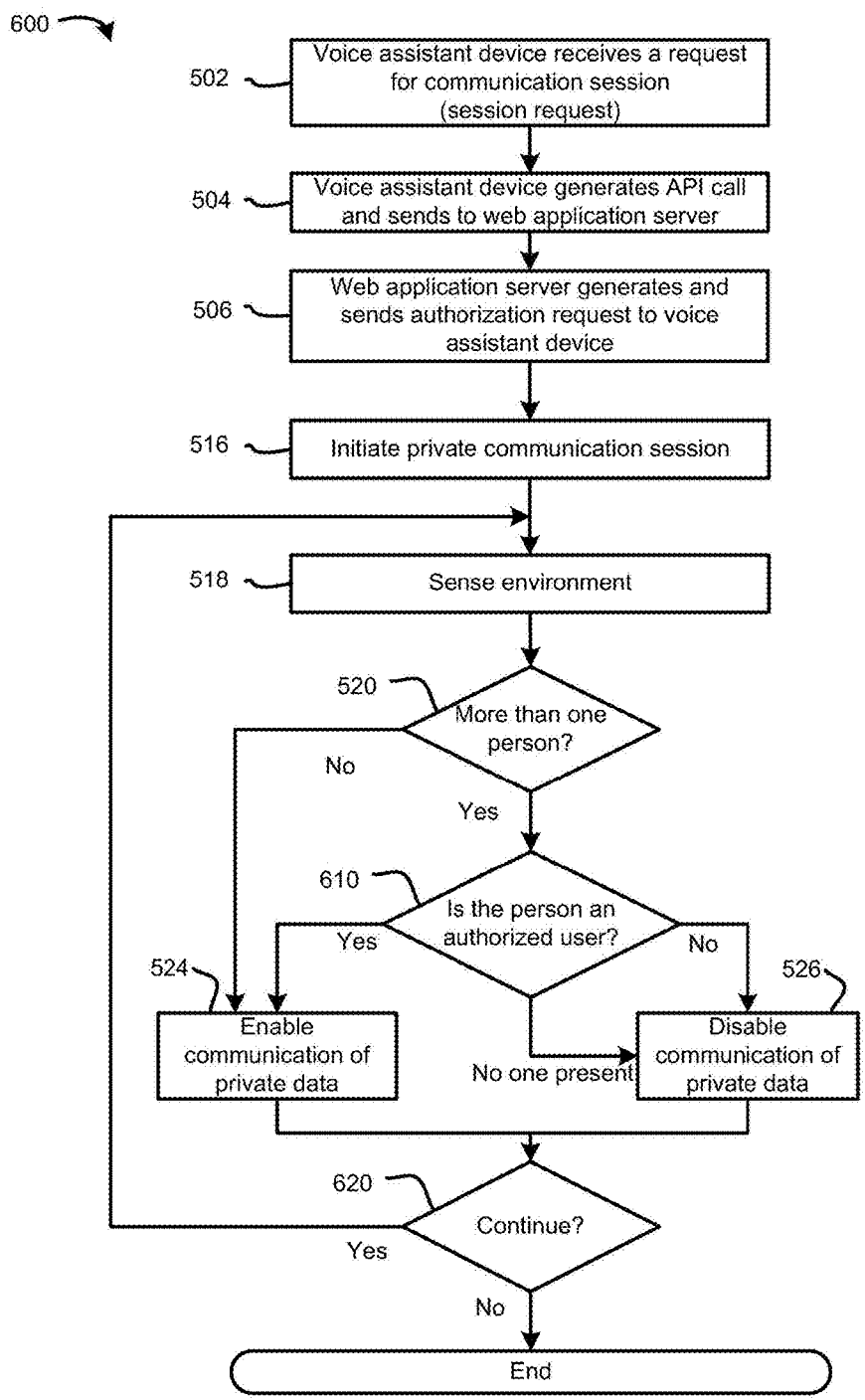
FIG. 4 is a flowchart illustrating a method of enforcing privacy during a communication session with a voice assistant on an electronic device in accordance with another example embodiment of the present disclosure.

Referring next to FIG. 4, a method 600 of enforcing privacy during a communication session with a voice assistant in accordance with one example embodiment of the present disclosure will be described. The method 600 is similar to the method 500 described above in connection with FIG. 3 with the notable difference that the user of the voice assistant device 200 is not authenticated after the request to initiate a communication session. Because the user of the voice assistant device 200 is not authenticated before initiating the communication session, multi-person support is not permitted for increased security. Thus, when more than one person is present in the environment of the electronic device, communication of private data by the voice assistant is disabled. In other embodiments, multi-person support may be permitted even though the user of the voice assistant device 200 is not authenticated before initiating the communication session.

In the method 600, when one person is present in the local environment 101 of the voice assistant device 200, the sensor data is processed to identify the one person (operation 520), and determine whether the one person is an authorized user (operation 610). When the one person in the environment is determined to be an authorized user, communication of private data by the voice assistant is enabled (operation 524). When the one person in the environment is determined not to be an authorized user, communication of private data by the voice assistant is disabled (operation 526). When no one is present in the local environment 101 of the voice assistant device 200, communication of private data by the voice assistant may also be disabled (operation 526).

The method 600 ends when the communication session ends (operation 620). Otherwise, the method 500 continues with the voice assistant device 200 sensing the environment 101 and evaluating the results at regular intervals to determine whether the local environment 101 in which the communication session is being held is private.

Although the various aspects of the method have been described as being performed by the voice assistant device 200 for the security of user data, in other embodiments processing steps may be performed by the voice assistant server 305, the web application server 315, or other intermediary entity (e.g., server) between the voice assistant device 200 and the web application server 315. In such alternate embodiments, the voice assistant device 200 merely collects data from the sensors 110 and/or 215, sends the sensor data to the voice assistant server 305, web application server 315 or other intermediary entity for analysis, receives the privacy enforcement instructions, and then applies privacy enforcement instructions.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

General

The coding of software for carrying out the above-described methods described is within the scope of a person of ordinary skill in the art having regard to the present disclosure. Machine readable code executable by one or more processors of one or more respective devices to perform the above-described method may be stored in a machine readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The term "processor" may comprise any programmable system comprising systems using micro- or nano-processors/controllers, reduced instruction set circuits (RISC), application specific integrated circuits (ASICs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. An electronic device, comprising:
 a speaker;
 a plurality of sensors for sensing an environment of the electronic device, wherein the plurality of sensors comprises one or more microphones;
 a memory;
 a processor coupled to the speaker, the plurality of sensors and the memory, wherein the processor is configured to cause the electronic device to:
 during a communication session with a voice assistant:
  acquire sensor data from one or more sensors in the plurality of sensors;
  determine, based on the sensor data, a number of persons present in the environment of the electronic device;
  determine, based on the sensor data, whether the one person present in the environment is an authorized user in response to a determination that one person is present in the environment;
  in response to a determination that one person is present in the environment of the electronic device and the one person in the environment has been determined to be an authorized user, enable communication of private data by a voice assistant; and
  in response to a determination that more than one person is present in the environment of the electronic device:
   disable communication of private data by the voice assistant;
   generate, via the speaker of the electronic device, an audible notification that the communication session is not private, the notification comprising a voice prompt whether to continue the communication session via a different channel or continue the communication session from a private location;
   receive, via the one or more microphones, a voice input;
   parse, via speech recognition, the voice input to extract a command to be performed from a plurality of commands;
   transfer the communication session to a second electronic device in response to the voice input containing a corresponding command;
   initiate a call back to a designated telephone number in response to the voice input containing a corresponding command; and
   temporarily suspend the communication session in response to the voice input containing a corresponding command.

2. The electronic device of claim 1, wherein the processor is further configured to:
 disable communication of private data by the voice assistant in response to a determination that the one person present in the environment is not the authorized user.

3. The electronic device of claim 1, wherein the sensor data used to determine the number of persons in the environment comprises one or a combination of a facial data, voice data, IR heat sensor data, movement sensor data, or wireless device usage data.

4. The electronic device of claim 3, wherein the authorized user is identified using voice recognition, facial recognition or a combination thereof, the sensor data used to identify the one person as the authorized user comprises voice data, facial data, or a combination thereof.

5. The electronic device of claim 1, wherein the processor is configured to determine the number of persons in the environment by:
   monitoring for and detecting wireless communication devices in the environment of the electronic device; and
   counting each wireless communication device in the environment of the electronic device being counted as a person in the environment of the electronic device.

6. The electronic device of claim 1, wherein the processor is further configured to:
   while the communication session is temporarily suspended:
      receive, via the one or more microphones, a voice input;
      parse, via speech recognition, the voice input to extract a command to be performed from a plurality of commands; and
      resume the communication session from the temporary suspension in response to the voice input containing a corresponding command.

7. The electronic device of claim 1, wherein the processor is further configured to:
   while the communication session is temporarily suspended:
      monitor for changes in the location of the electronic device to determine whether the authorized user has moved to a private location; and
      automatically resume the communication session from the temporary suspension in response to a determination that the authorized user has moved to a private location.

8. The electronic device of claim 1, wherein the processor is further configured to, in response to disablement communication of private data:
   generate, via the speaker of the electronic device, an audible notification that the communication session is not private, the notification comprising a voice prompt whether to continue communication of private data even though the communication session is not private;
   receive, via the one or more microphones, a voice input;
   parse, via speech recognition, the voice input to extract a command to be performed from a plurality of commands; and
   re-enable the communication of private data in response to the voice input containing a corresponding command.

9. The electronic device of claim 1, wherein the processor is further configured to, in response to disablement communication of private data:
   generate, via the speaker of the electronic device, an audible notification that the communication session is not private, the notification comprising a voice prompt whether to continue the communication session with only non-private data;
   receive, via the one or more microphones, a voice input;
   parse, via speech recognition, the voice input to extract a command to be performed from a plurality of commands;
   terminate the communication session in response to the voice input containing a corresponding command; and
   continue the communication session in response to the voice input containing a corresponding command.

10. The electronic device of claim 1, wherein the processor is further configured to:
   disable communication of private data by the voice assistant in response to a determination that no person is present in the environment of the electronic device.

11. An electronic device, comprising:
   a speaker;
   a plurality of sensors for sensing an environment of the electronic device, wherein the plurality of sensors comprises one or more microphones;
   a communication subsystem;
   a memory;
   a processor coupled to the speaker, the plurality of sensors, the communication subsystem and the memory, wherein the processor is configured to cause the electronic device to:
   during a communication session with a voice assistant:
      acquire sensor data from one or more sensors of the plurality of sensors;
      send the sensor data to a remote server to process the sensor data;
      receive privacy enforcement instructions from the remote server in response to processing the sensor data; and
      apply the privacy enforcement instructions, wherein application of the privacy enforcement instructions causes the electronic device to:
         in response to a determination that one person is present in the environment of the electronic device and the one person in the environment has been determined to be an authorized user, enable communication of private data by a voice assistant; and
         in response to a determination that more than one person is present in the environment of the electronic device:
            disable communication of private data by the voice assistant;
            generate, via the speaker of the electronic device, an audible notification that the communication session is not private, the notification comprising a voice prompt whether to continue the communication session via a different channel or continue the communication session from a private location;
            receive, via the one or more microphones, a voice input;
            parse, via speech recognition, the voice input to extract a command to be performed from a plurality of commands;
            transfer the communication session to a second electronic device in response to the voice input containing a corresponding command;
            initiate a call back to a designated telephone number in response to the voice input containing a corresponding command; and
            temporarily suspend the communication session in response to the voice input containing a corresponding command.

12. A server, comprising:
   a communication subsystem;
   a memory;
   a processor coupled to the communication subsystem and the memory, wherein the processor is configured to cause the server to:
   receive sensor data acquired by one or more sensors of a plurality of sensors of an electronic device;

determine, based on the sensor data, a number of persons present in the environment of the electronic device;

determine, based on the sensor data, whether the one person is an authorized user in response to a determination that one person is present in the environment of the electronic device;

generate privacy enforcement instructions in response to processing the sensor data; and send the privacy enforcement instructions to the electronic device on which the privacy enforcement instructions are to be applied, wherein application of the privacy enforcement instructions causes the electronic device to:

in response to a determination that one person is present in the environment of the electronic device and the one person in the environment has been determined to be an authorized user, enable communication of private data by a voice assistant; and in response to a determination that more than one person is present in the environment of the electronic device:

disable communication of private data by the voice assistant;

generate, via a speaker of the electronic device, an audible notification that the communication session is not private, the notification comprising a voice prompt whether to continue the communication session via a different channel or continue the communication session from a private location;

receive, via one or more microphones of the electronic device, a voice input;

parse, via speech recognition, the voice input to extract a command to be performed from a plurality of commands;

transfer the communication session to a second electronic device in response to the voice input containing a corresponding command;

initiate a call back to a designated telephone number in response to the voice input containing a corresponding command; and temporarily suspend the communication session in response to the voice input containing a corresponding command.

13. The server of claim 12, wherein the processor is configured to identify the one person in response to a determination that one person is present in the environment of the voice assistant.

14. An electronic device, comprising:
a speaker;
a plurality of sensors for sensing an environment of the electronic device, wherein the plurality of sensors comprises one or more microphones;
a memory;
a processor coupled to the speaker, the plurality of sensors and the memory, wherein the processor is configured to cause the electronic device to:
during a communication session with a voice assistant:
acquire sensor data from one or more sensors in the plurality of sensors;
determine, based on the sensor data, whether the environment of the electronic device is private;
in response to a determination that the environment of the electronic device is private, enable communication of private data by the voice assistant; and in response to a determination that the environment of the electronic device is non-private:
disable communication of private data by the voice assistant;
generate, via the speaker of the electronic device, an audible notification that the communication session is not private, the notification comprising a voice prompt whether to continue the communication session via a different channel or continue the communication session from a private location;
receive, via the one or more microphones, a voice input;
parse, via speech recognition, the voice input to extract a command to be performed from a plurality of commands;
transfer the communication session to a second electronic device in response to the voice input containing a corresponding command;
initiate a call back to a designated telephone number in response to the voice input containing a corresponding command; and
temporarily suspend the communication session in response to the voice input containing a corresponding command.

15. The electronic device of claim 14, wherein the processor is further configured to:
while the communication session is temporarily suspended:
receive, via the one or more microphones, a voice input;
parse, via speech recognition, the voice input to extract a command to be performed from a plurality of commands; and
resume the communication session from the temporary suspension in response to the voice input containing a corresponding command.

16. The electronic device of claim 14, wherein the processor is further configured to:
while the communication session is temporarily suspended:
monitor for changes in the location of the electronic device to determine whether the authorized user has moved to a private location; and
automatically resume the communication session from the temporary suspension in response to a determination that the authorized user has moved to a private location.

17. The electronic device of claim 14, wherein the processor is further configured to, in response to disablement communication of private data:
generate, via the speaker of the electronic device, an audible notification that the communication session is not private, the notification comprising a voice prompt whether to continue communication of private data even though the communication session is not private;
receive, via the one or more microphones, a voice input;
parse, via speech recognition, the voice input to extract a command to be performed from a plurality of commands; and
re-enable the communication of private data in response to the voice input containing a corresponding command.

18. The electronic device of claim 14, wherein the processor is further configured to, in response to disablement communication of private data:

generate, via the speaker of the electronic device, an audible notification that the communication session is not private, the notification comprising a voice prompt whether to continue the communication session with only non-private data;

receive, via the one or more microphones, a voice input;

parse, via speech recognition, the voice input to extract a command to be performed from a plurality of commands;

terminate the communication session in response to the voice input containing a corresponding command; and continue the communication session in response to the voice input containing a corresponding command.

19. An electronic device, comprising:
a speaker;
a plurality of sensors for sensing an environment of the electronic device, wherein the plurality of sensors comprises one or more microphones;
a communication subsystem;
a memory;
a processor coupled to the speaker, the plurality of sensors, the communication subsystem and the memory, wherein the processor is configured to cause the electronic device to:
during a communication session with a voice assistant:
acquire sensor data from one or more sensors in the plurality of sensors;
send the sensor data to a remote server to process the sensor data;
receive privacy enforcement instructions from the remote server in response to processing the sensor data; and
apply the privacy enforcement instructions, wherein application of the privacy enforcement instructions causes the electronic device to:
in response to a determination that the environment of the electronic device is private, enable communication of private data by the voice assistant; and
in response to a determination that the environment of the electronic device is non-private:
disable communication of private data by the voice assistant;
generate, via the speaker of the electronic device, an audible notification that the communication session is not private, the notification comprising a voice prompt whether to continue the communication session via a different channel or continue the communication session from a private location;
receive, via the one or more microphones, a voice input;
parse, via speech recognition, the voice input to extract a command to be performed from a plurality of commands;
transfer the communication session to a second electronic device in response to the voice input containing a corresponding command;
initiate a call back to a designated telephone number in response to the voice input containing a corresponding command; and
temporarily suspend the communication session in response to the voice input containing a corresponding command.

20. A server, comprising:
a communication subsystem;
a memory;
a processor coupled to the communication subsystem and the memory, wherein the processor is configured to cause the server to:
receive sensor data acquired by one or more sensors of plurality of sensors of an electronic device;
determine, based on the sensor data, whether the environment of the electronic device is private;
generate privacy enforcement instructions based on the determination as to whether the environment of the electronic device is private; and
send the privacy enforcement instructions to an electronic device on which the privacy enforcement instructions are to be applied, wherein application of the privacy enforcement instructions causes the electronic device to:
in response to a determination that the environment of the electronic device is private, enable communication of private data by the voice assistant; and
in response to a determination that the environment of the electronic device is non-private:
disable communication of private data by the voice assistant;
generate, via a speaker of the electronic device, an audible notification that the communication session is not private, the notification comprising a voice prompt whether to continue the communication session via a different channel or continue the communication session from a private location;
receive, via one or more microphones of the electronic device, a voice input;
parse, via speech recognition, the voice input to extract a command to be performed from a plurality of commands;
transfer the communication session to a second electronic device in response to the voice input containing a corresponding command;
initiate a call back to a designated telephone number in response to the voice input containing a corresponding command; and
temporarily suspend the communication session in response to the voice input containing a corresponding command.

* * * * *